(12) United States Patent
Enloe et al.

(10) Patent No.: US 7,380,756 B1
(45) Date of Patent: Jun. 3, 2008

(54) SINGLE DIELECTRIC BARRIER AERODYNAMIC PLASMA ACTUATION

(75) Inventors: Carl L. Enloe, Colorado Springs, CO (US); Thomas E. McLaughlin, Colorado Springs, CO (US); Eric J. Jumper, Granger, IN (US); Thomas C. Corke, Granger, IN (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 583 days.

(21) Appl. No.: 10/994,029

(22) Filed: Nov. 16, 2004

Related U.S. Application Data

(60) Provisional application No. 60/520,787, filed on Nov. 17, 2003.

(51) Int. Cl.
*B64C 13/02* (2006.01)

(52) U.S. Cl. .................. 244/175; 244/205; 244/198; 244/130

(58) Field of Classification Search ............... 244/175, 244/205, 198, 200, 130, 171.7
See application file for complete search history.

(56) References Cited

U.S. PATENT DOCUMENTS

| | | |
|---|---|---|
| 3,662,554 A | 5/1972 | De Brouqueville |
| 3,959,104 A | 5/1976 | Fales |
| 4,786,020 A | 11/1988 | Franke et al. |
| 5,198,724 A | 3/1993 | Koinuma et al. |
| 5,369,336 A | 11/1994 | Koinuma et al. |
| 5,403,453 A | 4/1995 | Roth et al. |
| 5,414,324 A | 5/1995 | Roth et al. |
| 5,437,421 A | 8/1995 | Nosenchuck et al. |
| 5,456,972 A | 10/1995 | Roth et al. |
| 5,669,583 A | 9/1997 | Roth |
| 5,791,599 A | 8/1998 | Blackburn et al. |
| 5,797,563 A | 8/1998 | Blackburn et al. |
| 5,934,622 A | 8/1999 | Meng |

(Continued)

OTHER PUBLICATIONS

M. Post et al., "Separation Control on High Angle of Attach Airfoil Using Plasma Actuators", 41st Aerospace Sciences Meeting & Exhibit, paper AIAA 2003-1024, 2003, Reno, NV.

(Continued)

*Primary Examiner*—Timothy D. Collins
(74) *Attorney, Agent, or Firm*—AFMCLO/JAZ; Gerald B. Hollins

(57) ABSTRACT

A single dielectric barrier aerodynamic plasma actuator apparatus based on the dielectric barrier discharge phenomenon is disclosed and suggested for application to aerodynamic uses for drag reduction, stall elimination and airfoil efficiency improvement. In the plasma actuator apparatus non-uniform in time and space, partially ionized gasses are generated by one or more electrode pairs each having one electrically encapsulated electrode and one air stream exposed electrode and energization by a high-voltage alternating current waveform. The influence of electrical waveform variation, electrode polarity, electrode size and electrode shape on the achieved plasma are considered along with theoretical verification of achieved results. Light output, generated thrust, ionizing current waveform and magnitude and other variables are considered. Misconceptions prevailing in the present day plasma generation art are addressed and are believed-to-be corrected. The influence of electrostatic shielding effects of the developed plasma on the applied electric field are also considered.

24 Claims, 19 Drawing Sheets

U.S. PATENT DOCUMENTS

| | | | |
|---|---|---|---|
| 5,961,772 | A | 10/1999 | Selwyn |
| 6,049,086 | A | 4/2000 | Foggiato et al. |
| 6,200,539 | B1 | 3/2001 | Sherman et al. |
| 6,220,549 | B1 | 4/2001 | Tsunoda et al. |
| 6,247,671 | B1 | 6/2001 | Saeks et al. |
| 6,262,523 | B1 | 7/2001 | Selwyn et al. |
| 6,570,333 | B1 | 5/2003 | Miller et al. |
| 6,805,325 | B1 | 10/2004 | Malmuth et al. |
| 6,824,108 | B2 | 11/2004 | Bonutti |
| 7,017,863 | B2 * | 3/2006 | Scott et al. .......... 244/205 |
| 2003/0030374 | A1 | 2/2003 | Pai |
| 2004/0011764 | A1 | 1/2004 | De Vries et al. |
| 2004/0091418 | A1 | 5/2004 | Carlow et al. |
| 2004/0124367 | A1 | 7/2004 | Olstowski |

OTHER PUBLICATIONS

D. Ashpis et al., "Demonstration of Separation Delay with Glow Discharge Plasma Actuators", 41st Aerospace Sciences Meeting & Exhibit, paper AIAA 2003-1025, 2003, Reno, NV.

J. List et al, Using Plasma Actuator Flaps to Control Laminar Separation on Turbine Blades in a Linear Cascade, 41st Aerospace Sciences Meeting & Exhibit, paper AIAA 2003-1026, 2003, Reno, NV.

J. Huang et al., "Plasma Actuators for Separation Control of Low Pressure Turbine Blades", 41st Aerospace Sciences Meeting & Exhibit, paper AIAA 2003-1027, 2003, Reno, NV.

T.C. Corke et al., "Application of Weakly-Ionized Plasmas as Wing Flow-Control Devices", 40th Aerospace Sciences Meeting & Exhibit, paper AIAA 2002-0350, 2002, Reno, NV.

J.R. Roth et al., "Electrohydro-dynamic Flow Control with a Glow-Discharge Surface Plasma", AIAA Journal, 2000, vol. 38.

T.C. Corke et al., "Phased Plasma Arrays for Unsteady Flow Control", Fluids 2000, paper AIAA 2000-2323, Denver, CO.

J.R. Roth et al., "Boundary Layer Flow Control with a One Atmosphere Uniform Glow Discharge Surface Plasma", 36th Aerospace Sciences Meeting & Exhibit, 1998, paper AIAA 98-0328, Reno, NV.

W.S. Kang et al., "Spatio-Temporal Images of Single Streamer Propagation in Dielectric Barrier Discharge", IEEE Trans. Plasma Sci., 2002, pp. 166-167, vol. 30.

S. Liu et al., "Excitatioin of Dielectric Barrier Discharges by Unipolar Submicrosecond Square Pulses", J. Phys. D: Appl. Phys., 2001, pp. 1632-1638, vol. 34.

V.I. Gibalov et al., "The Development of Dielectric Barrier Discharges in Gas Gaps and on Surfaces" J. Phys. D: Appl. Phys., 2000, pp. 2618-2636, vol. 33.

G. Steinle et al., "Two-Dimensional Simulation of Filaments in Barrier Discharges", J. Phys. D: Appl. Phys., 1999, pp. 1350-1356, vol. 32.

F. Massines et al., "Experimental and Theroretical Study of a Glow Discharge at Atmospheric Pressure Controlled by Dielectric Barrier", J. Appl. Phys., 1998, pp. 2950-2957, vol. 83.

J. Li et al., "Simulation of Microdischarges in a Dielectric-Barrier Discharge", J. Appl. Phys., 1997, pp. 4205-4210, vol. 82.

Z. Falkenstein et al., "Microdischarge Behavior in the Silent Discharge of Nitrogen-Oxygen and Water-Air Mixtures", J. Phys. D: Appl. Phys., 1997, pp. 817-825, vol. 30.

B. Pashaie et al., "Electrical Characteristics of a Coaxial Dielectric Barrier Discharge", J. Phys. D: Appl. Phys., 1994, pp. 2107-2110, vol. 27.

E. Wharburg, "(title)", Ann. Phys., 1904, pp. 464-476, vol. Lpz. 13.

W. Shyy et al., "Modeling of Glow-Discharge-Induced Fluid Dynamics", accepted for publication in J. Appl. Phys.

J. Park et al., "Neutral Bremsstrahlung Measurement in an Atmospheric-Pressure Radio Frequency Discharge", Phys. Plasmas, 2000, pp. 3141-3144, vol. 7.

C.L. Enloe et al., Mechanisms and Responses of a Single Dielectric Barrier Plasma, 41st Aerospace Sciences Meeting & Exhibit, Jan. 8, 2003, paper AIAA 2003-1021, Reno, NV.

C.L. Enloe et al, "Mechanisms and Responses of a Single Dielectric Barrier Plasma Actuator: Plasma Morphology", AIAA Journal, 2004, pp. 589-594, vol. 42.

C.L. Enloe et al., "Mechanisms and Responses of a Single Dielectric Barrier Plasma Actuator: Geometric Effects", AIAA Journal, 2004, pp. 595-604, vol. 42.

* cited by examiner

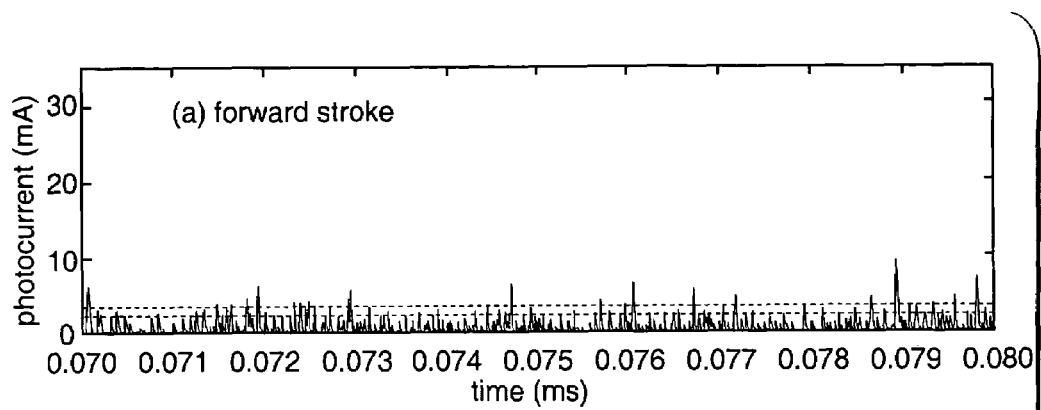
Fig. 2A
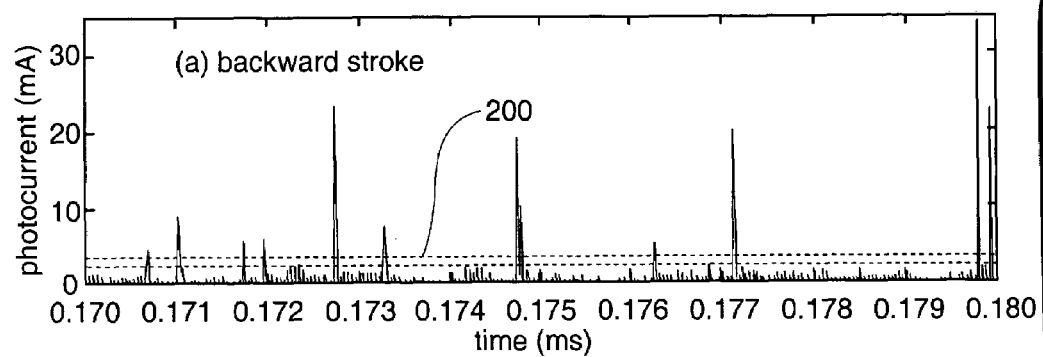
Fig. 2B
Fig. 2

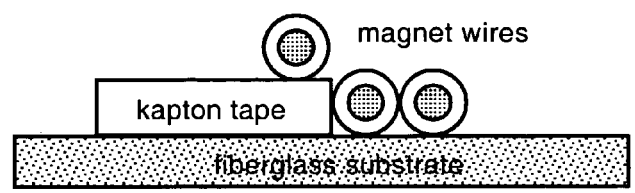
Fig. 26
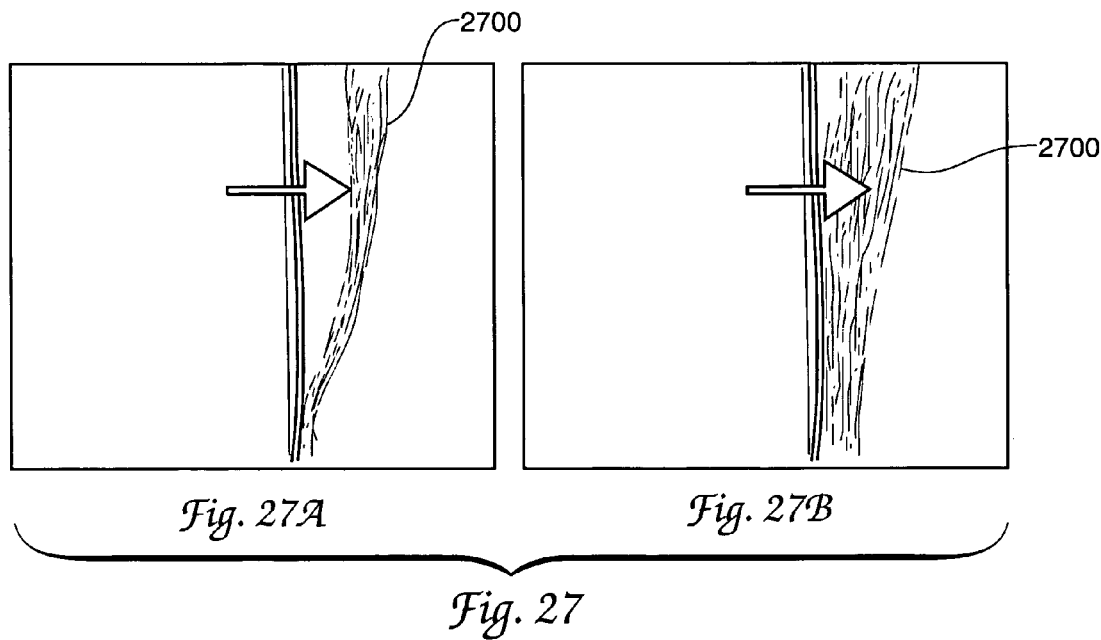
Fig. 27A     Fig. 27B
Fig. 27

SINGLE DIELECTRIC BARRIER AERODYNAMIC PLASMA ACTUATION

CLAIM OF PRIORITY

This application claims the benefit of U.S. Provisional Patent Application No. 60/520,787, filed Nov. 17, 2003. The contents of this provisional application are hereby incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

Airfoils are found in many different shapes, sizes and functions in the aircraft and related arts. The Wright brothers, Orville and Wilbur, are for example known to have devoted extensive time to the achieving of a surprisingly efficient airfoil cross section for the propellers used on their early 1900's flyers. Airfoil shapes are of course also found in aircraft wing cross sections, in tail assemblies and in helicopter rotors as a short list of examples. Each of these airfoils involves a compromise between the achieved lift and drag characteristics of the selected shape. The results of sharply differing compromises in this area may be appreciated to some small degree by consideration of the differing wing designs used in the World War II U.S. bomber aircraft known as the B-17 and the B-24. The B-17 wing is or was of a large and long cross sectional shape and resulted in what was considered a tolerant and forgiving airfoil while the B-24 wing was considerably smaller yet capable of lifting a significantly larger aircraft payload but also was less tolerant of marginal flight conditions.

In many airfoil arrangements the achieved overall performance can be improved by way of drag reduction; a reduction accomplished through consideration of boundary layer air flow conditions between the wing surface and the surrounding air. The introduction of small boundary layer air or gas flows into this area of transition is one tool that is found useful in achieving better airfoil performance. Such boundary layer air or gas flows may be realized in a variety of ways including use of pressurized air dispensers and with use of plasma generating apparatus, apparatus in which a relatively small amount of ionized ambient fluid or air is introduced into the airfoil transition area by way of electrical plasma generating elements disposed at a selected location along the air flow path of the airfoil. For present purposes such an electrical apparatus will be discussed using the formal name of "single dielectric barrier aerodynamic plasma actuator". In the present invention the mechanism for generating this plasma is recognized to be that of the dielectric barrier electrical discharge notwithstanding the views of accomplished others working in this art that some differing plasma generating mechanism is involved.

SUMMARY OF THE INVENTION

The present invention provides a plasma generating apparatus that is particularly appropriate for use with an aerodynamic airfoil. The invention is disclosed by way of examples supporting a conclusion that the achieved plasma generation occurs by way of a dielectric barrier discharge mechanism.

It is therefore an object of the present invention to provide an improved aerodynamic airfoil.

It is another object of the invention to provide a dielectric barrier discharge apparatus suited to use with an aerodynamic plasma actuator.

It is another object of the invention to disclose a series of characteristics of a plasma generating apparatus supporting the conclusion that a dielectric barrier discharge mechanism is operative in the apparatus.

It is another object of the invention to disclose the operating mechanism of a dielectric barrier discharge aerodynamic plasma actuator.

It is another object of the invention to disclose certain characteristics of an ionized gas plasma generated by a "single dielectric barrier aerodynamic plasma actuator" mechanism.

It is another object of the invention to provide an optimum energization arrangement for a dielectric barrier discharge plasma generation apparatus.

It is another object of the invention to provide optimum electrode configurations for dielectric barrier discharge aerodynamic plasma actuator apparatus.

It is another object of the invention to provide optimum voltage waveforms for use in a dielectric barrier discharge aerodynamic plasma actuator.

It is another object of the invention to provide a degree if theoretical support for use of a dielectric barrier discharge apparatus in an aerodynamic plasma actuator apparatus.

It is another object of the invention to disclose the results of laboratory work supporting presence of a dielectric barrier discharge phenomenon in the present aerodynamic plasma actuator invention.

It is another object of the invention to provide identification of dielectric barrier discharge work by others that is relevant to an aerodynamic plasma actuator apparatus.

These and other objects of the invention will become apparent as the description of the representative embodiments proceeds.

These and other objects of the invention are achieved by the dielectric barrier discharge method of improving airflow characteristics of an aerodynamic vehicle component element, said method comprising the steps of:

disposing along an airflow surface of said aerodynamic vehicle component element a plasma film generating electrical discharge supporting electrode array having an extended electrode dimension generally orthogonal of lateral airflow across said airflow surface;

providing in said electrical discharge supporting electrode array a first dielectric barrier enclosure-surrounded electrode conductor and an overlying, adjacent, laterally displaced, second airflow exposed electrode conductor;

growing a filamented, light-emitting, time dependent dielectric barrier discharge plasma film laterally over a first electrode conductor-adjacent surface of said dielectric barrier enclosure;

said time dependent growing plasma film extending in a lateral direction determined by relative positioning of said first electrode conductor and said second electrode conductor on said airflow surface and extending over a time dependent lateral distance of said dielectric barrier enclosure;

said growing step including energizing said second airflow exposed electrode conductor with a source of alternating current electrical energy of kilovolt peak electrical potential with respect to said first dielectric barrier-surrounded electrode conductor;

selecting a dielectric barrier plasma film enhancing alternating current electrical energy voltage waveform of relatively slow voltage change in one direction and relatively fast voltage change in opposed direction for said source of alternating current electrical energy of kilovolt peak electrical potential;

said energized electrical discharge supporting array generating a plasma directed momentum influenced improved pattern of lateral air flow across said aerodynamic vehicle component element airflow surface.

BRIEF DESCRIPTION OF THE DRAWINGS

The accompanying drawings incorporated in and forming a part of the specification, illustrate several aspects of the present invention and together with the description serve to explain the principles of the invention. In the drawings:

FIG. 2 includes the views of FIG. 2A and FIG. 2B and shows a refinement of the FIG. 1B data.

FIG. 26 shows a double insulated plasma actuator apparatus useful in plasma discharge asymmetry investigation.

FIG. 27 includes the views of FIG. 27A and FIG. 27B and shows plasma patterns for differing applied plasma voltage polarities.

DETAILED DESCRIPTION

The following description refers to a list of some 21 published references that are identified in an included Appendix hereto and in an Information Disclosure Statement filed with the original application. These references are hereby incorporated by reference herein.

Figure 6:
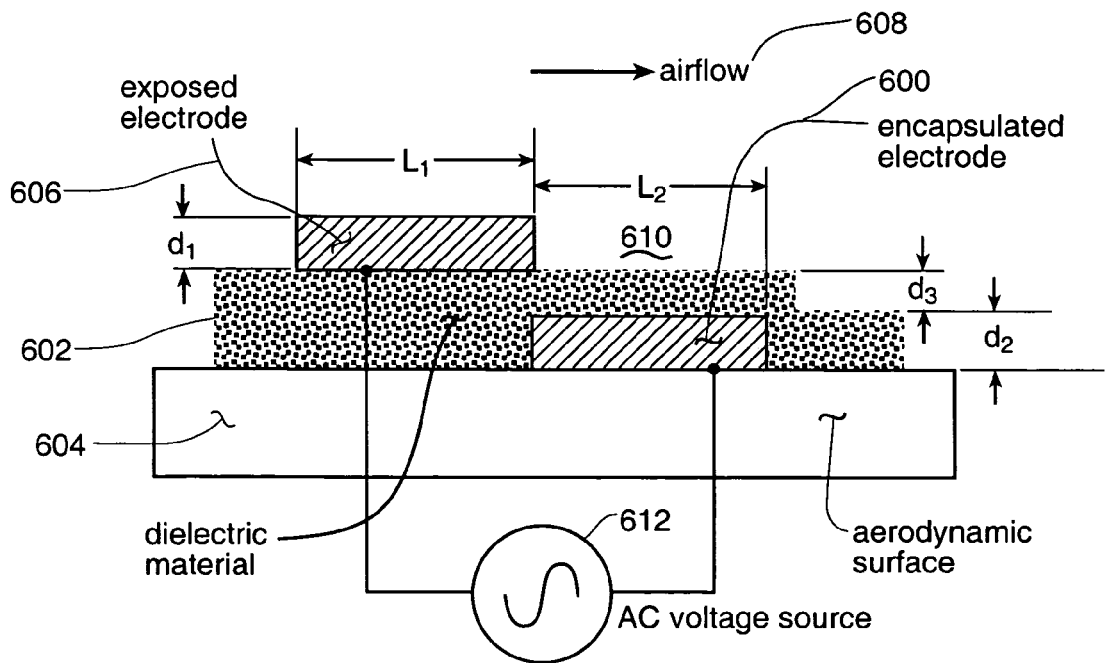
FIG. 6 defines a cross section and a plurality of physical dimensions for a present invention apparatus.

FIG. 6 in the drawings shows a cross sectional view of the salient parts of a "single dielectric barrier aerodynamic plasma actuator" in accordance with the present invention. In the FIG. 6 drawing an aerodynamic surface such as the metal sheet skin of for example an aircraft wing appears at 604 and a dielectric covering over this surface appears at 602. A pair of electrodes 600 and 606 is show to attend the dielectric covering 602 with one of these electrodes, 606, being exposed to the passing air stream as is represented at 608. The remaining one of the electrode pair, the electrode 600, is completely surrounded or encapsulated by the dielectric material 602 in the FIG. 6 apparatus. The electrode 600 may or may not be connected electrically with the aircraft metal skin 604; the active region of the FIG. 1 apparatus occurs primarily on the dielectric surface at 610 and extends to the right in the FIG. 6 drawing thus the electrically insulated or connected status of the electrode 600 is not of great significance in the function of the FIG. 6 apparatus. A source of alternating current energy for energization of the FIG. 6 apparatus is represented at 612 in FIG. 6. Additional details regarding the alternating current energy source 612 and remaining parts of the FIG. 6 drawing are disclosed in later paragraphs of this document. For brevity and reading convenience purposes the FIG. 6 "single dielectric barrier aerodynamic plasma actuator" apparatus is referred to herein as a "a plasma actuator apparatus" or more simply as a "plasma actuator" or an "actuator" and the quotation marks are omitted.

Representative numerical values for the single dielectric barrier aerodynamic plasma actuator dimensions shown in FIG. 6 are as follows:

$d_1$=0.015 inch; $d_2$=0.015 inch; $d_3$=0.1 inch; $L_1$=0.1 inch; $L_2$=0.25 inch. These dimensions may of course be altered within reasonable limits to suit the needs of a particular airfoil and also to meet optimization and manufacturing requirements. Specifically we find that minimizing $d_1$ optimizes actuator performance, while $d_2$ has no effect on performance and may be tailored to meet manufacturing requirements. Similarly, we find that $d_3$ may be increased to avoid electrical breakdown without a performance penalty, while for optimum performance $L_2$ should be determined by the operating voltage used in the actuator.

The specific configuration of the FIG. 6 plasma actuator on an airfoil and the preferred location of an actuator on an airfoil depend on the particular flow phenomena that is to be controlled by the plasma actuator. In the case of air flow separation the actuator is most effective when placed at the point of separation of the flow. For leading-edge separation this is at the leading edge of the airfoil for example. For lift enhancement the optimum actuator location is at the trailing edge of the airfoil. The most efficient method of actuator operation also depends on the particular flow phenomena control objective.

Figures 1, 1A, 1B:
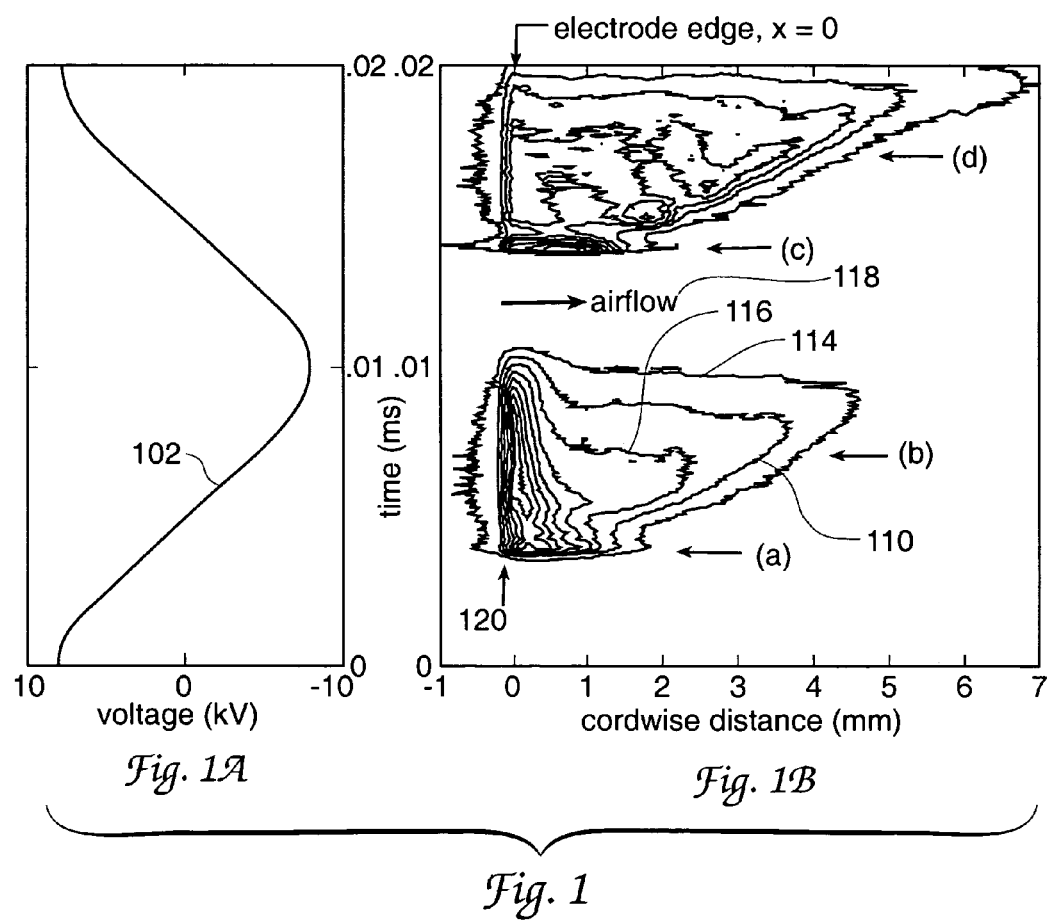
FIG. 1 includes the views of FIG. 1A and FIG. 1B and shows aerodynamic plasma actuator response to an electrical energy waveform.

FIG. 1B in the drawings shows the light output from a plasma actuator apparatus such as that shown in FIG. 6. The data in FIG. 1B indicates the presence of ionized gas or plasma—as a function of time and of location along the surface 610 in FIG. 6 i.e., in the lengthwise or air stream flow direction of the aerodynamic component into which the present invention plasma actuator apparatus is incorporated. Twice during each AC cycle of the applied voltage wave, as is represented at 102 in the FIG. 1A drawing, the plasma represented at 110 ignites, sweeps out over the surface of the dielectric in response to increasing voltage, and then quenches. Each of the FIG. 1B envelopes 114 and 116 for example represents a differing one of these plasma ignition and sweeping-out events. As shown the envelopes may have a different configuration at the right hand or terminal end. The left hand edge of each such envelope 114 and 116 is determined by the boundary of the exposed electrode. The FIG. 1B data is thus the result of a number of measurements being averaged and hence shows the overall temporal and spatial development of the generated aerodynamic plasma actuator plasma. The airflow over the aerodynamic component and the actuator is from left to right as is indicated at 118 in the FIG. 1B drawing. Notably the plasma at 110, 114 and 116 sweeps out primarily in the downstream direction rather than upstream or to the left of the electrode edge at 120 in FIG. 1B.

FIG. 2 in the drawings represents a high-time-resolution reoriented view of FIG. 1 data relating to a single transition of the applied voltage wave 102 and is a plot of plasma current flow versus time. The FIG. 2 data show that the plasma discharge of the present invention is not a uniform glow, but occurs as individual micro-discharges that are filamentary in nature. Equally importantly the FIG. 2 data shows that a constantly changing applied voltage is necessary to sustain the actuator plasma discharge; this is a hallmark of a dielectric barrier discharge. Once this constantly changing voltage condition is no longer met, as at the peaks of the alternating current waveform, the discharge extinguishes in a very short time—on the order of microseconds. No ion trapping is possible due to the rapid recombination of the ions during the extinguished interval.

FIG. 2A represents a forward stroke plasma in which the exposed electrode 606 of the actuator in FIG. 6, is positive in polarity with respect to the buried or encapsulated electrode 600. FIG. 2B shows the differing in nature negative stroke plasma; a discussion relating to this difference appears later herein. The double lines at 200 in the FIG. 2B drawing indicate the single photon response range current level and are significant in the FIG. 2A and FIG. 2B drawings because they allow distinction of the authentic signals of the plasma's light emission from electrical noise in the detector. During the negative-going portion of the alternating current voltage cycle the individual plasma micro-discharges are both much smaller and much more numerous than during the positive-going portion, resulting necessarily in a smaller light emission signal from any single micro-discharge event.

Figure 13:
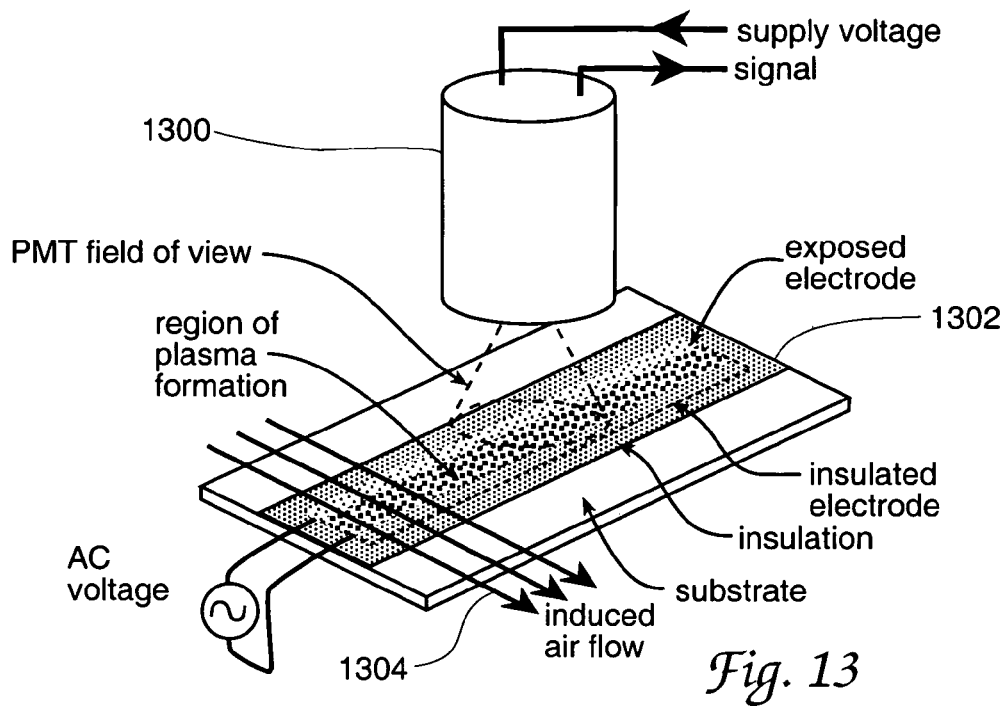
FIG. 13 shows a laboratory arrangement for detecting light emission from a present invention plasma actuator apparatus.

FIG. 13 in the drawings shows an experimental arrangement that may be used to make optical measurements of light emitted by the plasma of a discharge accomplished with the FIG. 6 apparatus. This discharge is of course accompanied by the introduction of a plasma into an initially still air environment surrounding the actuator or by a coupling of directed momentum into an air flow passing over the aerodynamic surface of the actuator, a flow that may be beneficially modified by the introduced plasma. Some characteristics of this flow and directed momentum may be appreciated from optical information collected with the FIG. 13 arrangement as is described in the ensuing paragraphs.

A photomultiplier tube (PMT) may be used to observe the bulk plasma of an actuator with high time resolution. For most of the optical measurements described herein, the photomultiplier tube 1300 is arranged to observe approximately one-third of the length of the plasma actuator 1302. For some measurements, a thin slit aperture may be interposed between the plasma and the photomultiplier tube, so that the light observations can be limited to approximately a one-millimeter wide region in the direction perpendicular to the electrodes.

Figure 14:
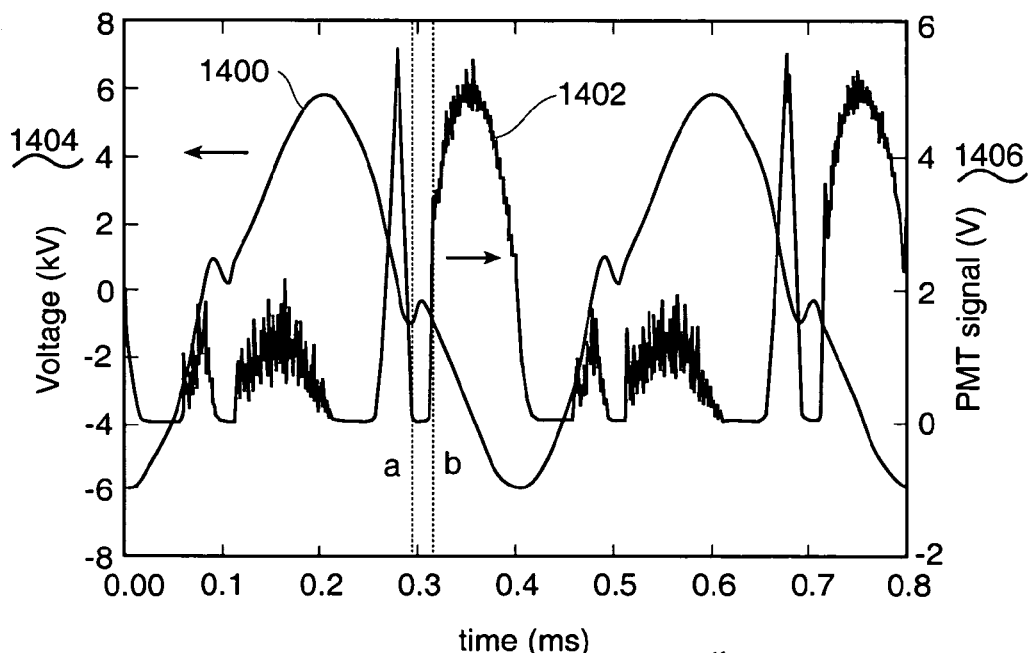
FIG. 14 shows relationship between an applied voltage and a plasma actuator apparatus light output.

We take the light emissions from a plasma actuator as a surrogate for plasma density, assuming that the recombination time of any individual ion in the plasma is short compared to the timescale of the overall envelope of the plasma discharge (an assumption confirmed experimentally). The first observation noted from the photomultiplier tube data is to the effect that what appears as a continuous plasma discharge to the eye has considerable temporal structure. The FIG. 14 drawing for example shows the voltage and light output for two cycles of a plasma discharge; a discharge that turns on and off four times in each cycle of the applied voltage. In FIG. 14 the waveform at 1400 relates to the left hand voltage scale 1404, the waveform 1402 to the right hand photomultiplier tube output scale 1406. The nature of the FIG. 14 light emission is characteristic of a dielectric barrier discharge; specifically in that the condition of a constantly changing applied voltage is necessary in order to maintain the plasma discharge. Note that when the applied voltage momentarily reverses its otherwise steady change from its most negative to its most positive excursion (for example, between points "a" and "b" in FIG. 14) the discharge extinguishes, only to re-ignite when the steady dV/dt change resumes.

The temporal nature of the actuator light output indicates that this plasma is indeed, as one would have inferred from the electrode configuration, a dielectric barrier discharge, a configuration about which there is considerable information in the literature, see references 10-18 dating even from the turn of the 20th century. The present plasma actuator differs from the most common dielectric barrier device configuration used in plasma processing, for example, in that it employs a single encapsulated electrode and an asymmetric electrode arrangement, but the principles of the discharge are the same. An important feature of a dielectric barrier discharge device is that, unlike a spark or a lightning bolt, it can sustain a large-volume discharge at atmospheric pressure without the discharge collapsing into a constricted arc. In a typical atmospheric discharge, the current tends to concentrate at one location. In the case of a dielectric barrier discharge however, the current tends to spread out over a large area, avoiding a catastrophic failure in some part of the discharge structure.

Figure 15:
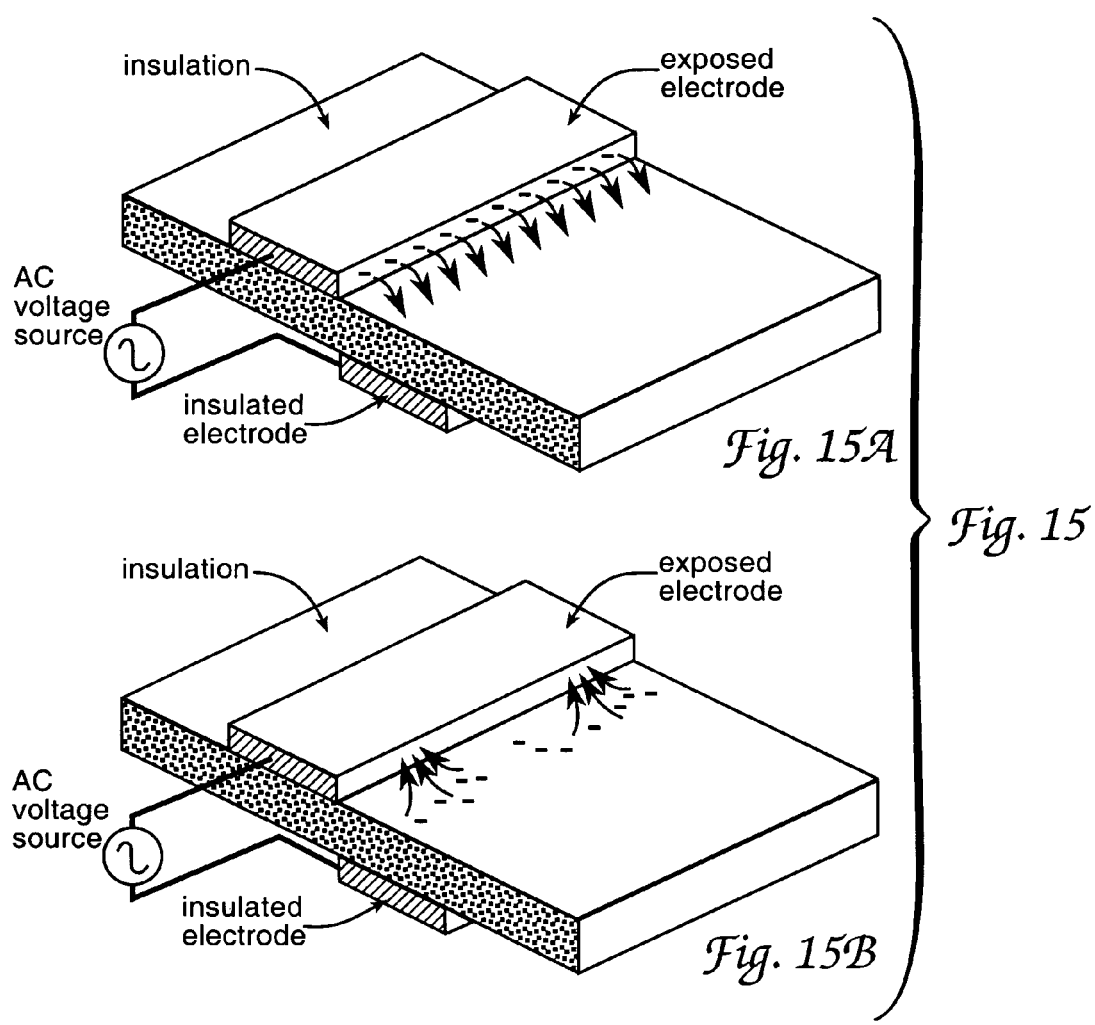
FIG. 15 includes the views of FIG. 15A and FIG. 15B relates to the self limiting nature of a dielectric barrier discharge.

A dielectric barrier discharge device can maintain such a large area discharge because the configuration is self-limiting, as is illustrated in the FIG. 15 drawing. FIG. 15A illustrates this by way of the half cycle of the discharge for which the exposed electrode is more negative than the surface of the dielectric. In this case, assuming the potential difference is high enough, the exposed electrode can emit electrons. Because the discharge terminates on a dielectric surface, however (hence the term "dielectric barrier"), the buildup of surface charge opposes the applied voltage, and the discharge shuts itself off unless the magnitude of the applied voltage is continually increased. This characteristic explains the behavior shown in the above referred-to waveform 1400 of FIG. 14. At point "a" in FIG. 14 due to some impedance mismatch in the driving circuit, there is a momentary reversal in the slope of the applied waveform. Because the applied voltage is no longer becoming more negative, the discharge 1402 shuts off at this point "a". When, at point "b", the applied voltage again resumes its negative course, the FIG. 14 discharge re-ignites and stays ignited until the slope of the voltage waveform goes to zero at approximately t=0.4 ms.

The behavior of the FIG. 14 discharge is similar on the opposite half-cycle where the exposed electrode 606 in FIG. 6 is more positive in polarity with respect to the dielectric surface. A positive slope in the applied voltage is necessary to maintain the discharge. In this half cycle, the charge available to the plasma discharge is limited to that deposited on the dielectric surface on the previous half-cycle, as shown in FIG. 15B.

Figure 16:
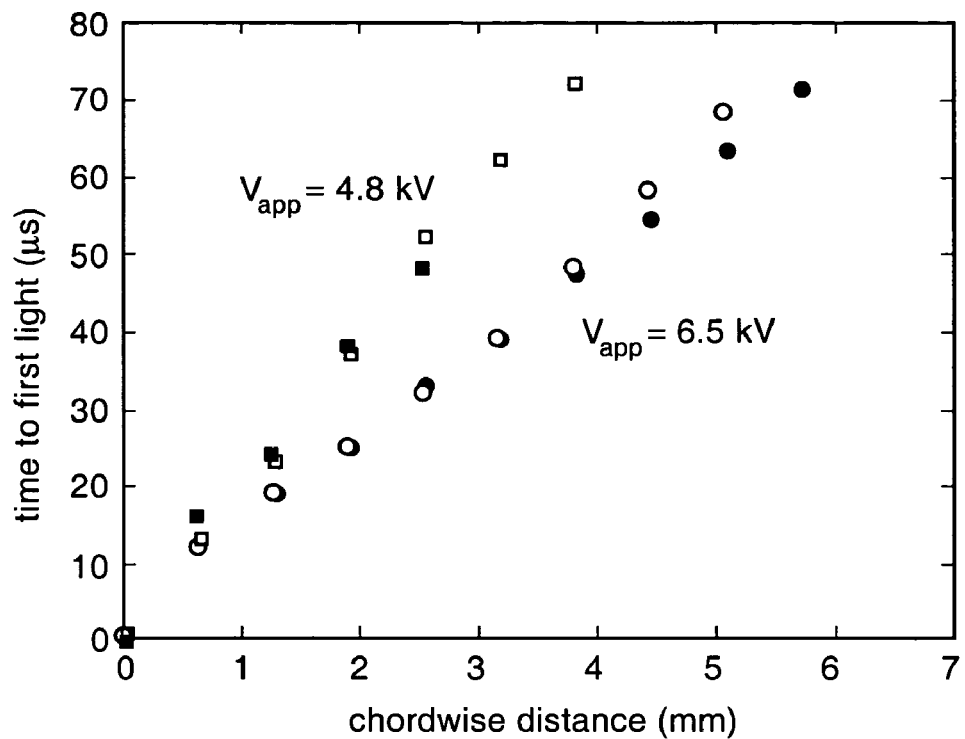
FIG. 16 shows a time to observe first plasma light versus observation point distance from plasma point of initiation for two different plasma generating voltages.

The FIG. 13 accomplished optical measurements also indicate that the lateral extent of the plasma develops in time. In an "open shutter" view of the generated plasma the shutter speed is longer than the period of the applied voltage waveform. In such a view one is tempted to interpret the observed plasma as showing a density gradient in the plasma, with the maximum density nearest the edge of the exposed electrode where the greatest plasma brightness is observed. Such an interpretation is however in error, as measurements of light emission through a narrow aperture arrangement in FIG. 13 show in the FIG. 16 drawing. FIG. 16 shows the relative time to first light as a function of aperture lateral position, i.e., aperture position along the direction of air stream flow 608 in FIG. 6. The FIG. 16 data clearly shows that the plasma grows in the lateral (chordwise) direction at a constant rate. Therefore, the fact that the plasma appears brighter nearer the electrode corresponds to that location having emitted light for a greater fraction of the discharge cycle, rather than to the presence of a higher plasma density.

From FIG. 16 and its two voltages it is also clear that the propagation speed of the discharge is a function of the amplitude of the applied voltage. The higher the voltage, the faster the discharge spreads along the dielectric surface. Furthermore, the propagation speed of the discharge is essentially the same for both half-cycles of the discharge (negative and positive-going) for a given voltage, and in both cases the discharge ignites at the edge of the exposed dielectric and propagates "downstream" along the dielectric surface. This symmetry in the structure of the discharge appears to refute a model proposed by Shyy in reference 15 implying that an asymmetry in the discharge structure is responsible for the production of net thrust by the actuator.

Figure 3A:
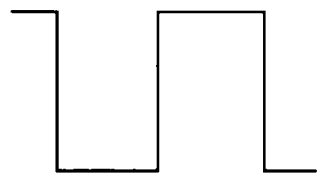
FIG. 3 includes the views of FIG. 3A, FIG. 3B, FIG. 3C, FIG. 3D and FIG. 3E and shows a comparison of electrical energy waveforms usable with the invention.
Figure 3B:
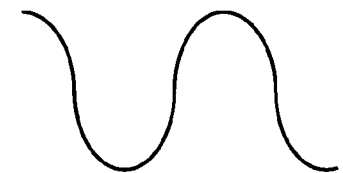
Figure 3C:
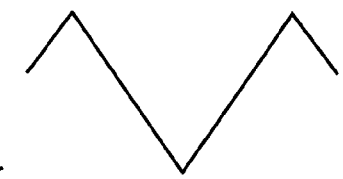
Figure 3D:
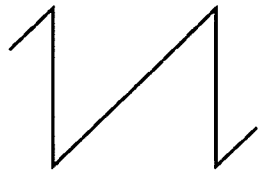
Figure 3E:
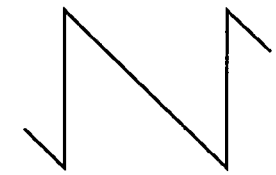
Figure 4:
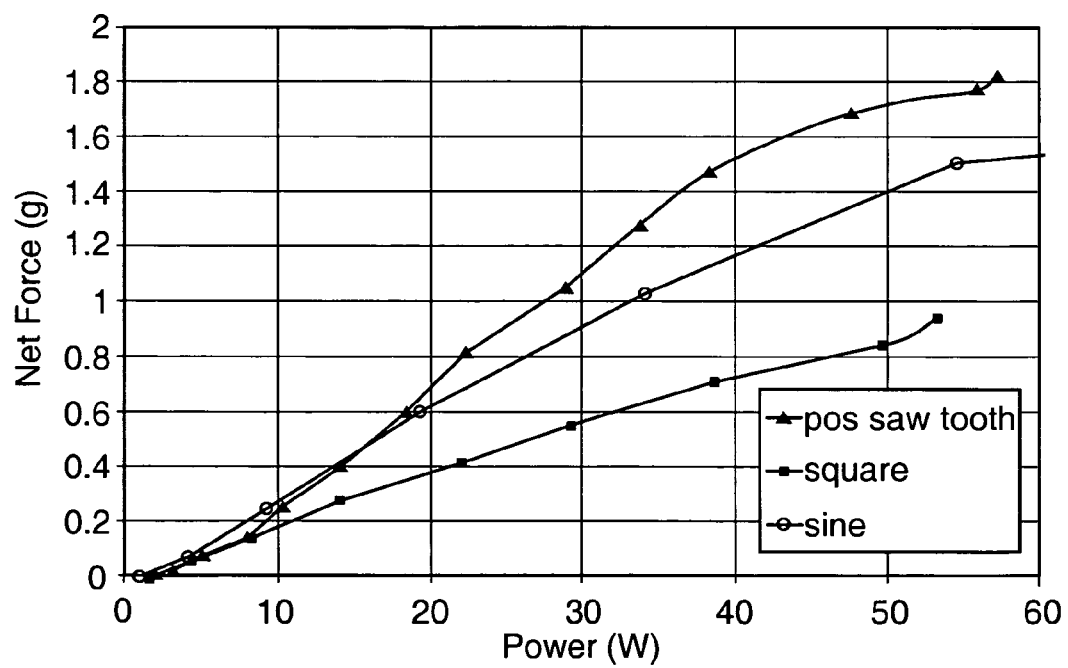
FIG. 4 shows the effect of different FIG. 3 waveforms on the present invention.

During operation of the present invention, plasma develops over time; an understanding of this concept is believed significant to optimizing operation of the invention. The present invention actuator plasma thus involves a dielectric barrier discharge phenomenon that is fundamentally governed by the buildup of electrical charge on the surface of the dielectric above the encapsulated electrode; therefore it is necessary to maintain a change in the applied voltage in order to maintain the plasma discharge. Since it is necessary to continually change the applied voltage in order to maintain the discharge, the shape of the applied voltage waveform affects the efficiency of the actuator. Generally the essence of this voltage and efficiency relationship is that the longer the fraction of the AC cycle in which the voltage is rapidly changing, the higher the performance of the actuator. A square wave input voltage as shown in FIG. 3A is therefore among the least efficient of the possible energizing waveforms, because the voltage is changing over a vanishingly small fraction of the alternating current waveform cycle, and is constant over a majority of the waveform cycle. Therefore, the plasma relating to FIG. 3A is maintained for a short fraction of the time and may be said to have a low duty cycle. A sinusoidal waveform as in FIG. 3B gives better plasma performance, because the voltage is constantly changing, although the rate of change diminishes near the crests and troughs of the wave, and results in a lower than optimum duty cycle. Optimum voltage waveforms include the triangle and sawtooth waves as shown in the drawings of FIG. 3 C through FIG. 3 E. These waveforms maintain a large rate of voltage change (that is, a large dV/dt) for essentially the entire alternating current cycle. The relative performance for three of these waveforms is shown in the drawing of FIG. 4 where present invention waveform efficiency is stated in terms of net force generated by an actuator having 0.25 inch by 0.015 inch cross sectional copper electrodes with a 0.028 inch Kapton® encapsulating film dielectric barrier.

Figure 5:
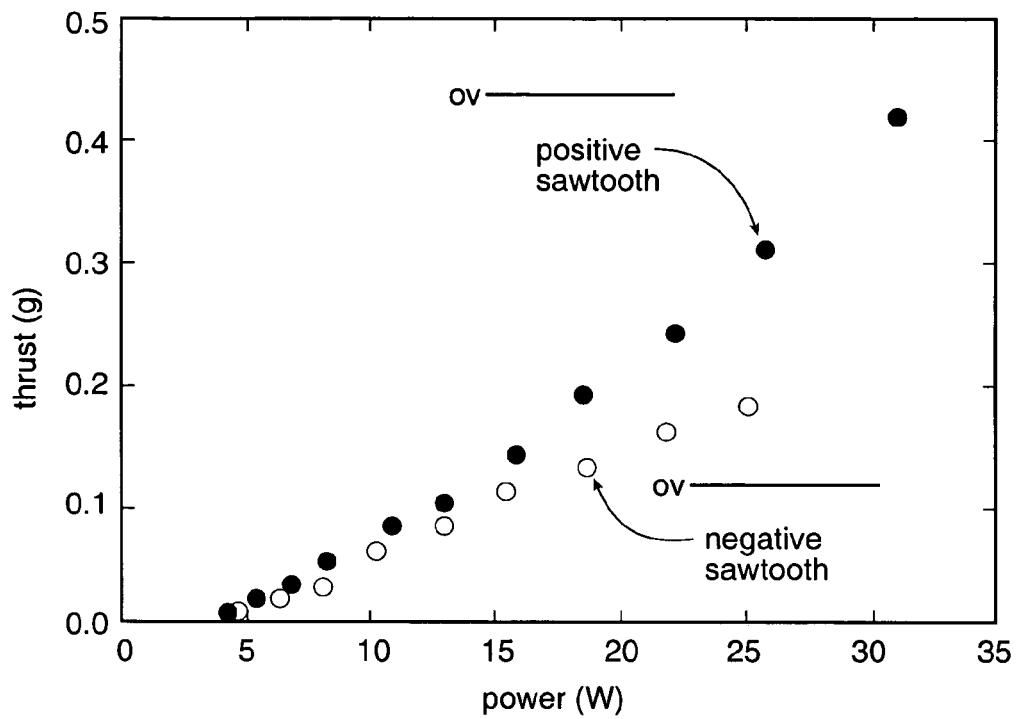
FIG. 5 shows a comparison of two similar electrical energy waveforms of opposed polarity for present invention use.

The filamentary nature of the generated plasma is also fundamental to optimizing its present invention operation. As shown in FIG. 2, the plasma discharge is more uniform during electrode 606 negative-going portions of the applied voltage waveform in FIG. 2B than for positive going portions in FIG. 2A. Actuator performance is also correlated to the FIG. 2A and FIG. 2B plasma structure. Applied voltage waveforms that maximize the negative-going portions of the waveform produce the highest-performing actuator as is shown in the thrust versus input power relationship of the FIG. 5 drawing. The waveforms in FIG. 5 are alternating current coupled and therefore have a zero volt level at the top to bottom center of the waveform.

In addition to showing the general configuration of an actuator according to the present invention the FIG. 6 drawing also defines significant dimensions to be considered in fabricating an actuator. The FIG. 6 dimensions particularly relate to the electrodes and the insulator of the actuator considered in order to optimize its performance. As shown by the time/space contours of light from the plasma disclosed in FIG. 1, when the plasma discharge is initiated, the plasma ignites near the edge of the exposed electrode and increases in the downstream dimension (parallel to the airflow) as time progresses and the discharge is maintained. There is essentially no plasma upstream of the electrode edge at 120 in FIG. 1. Therefore, in constructing a particular actuator, the optimum configuration is one in which the width, $L_1$, of the exposed electrode, as shown in FIG. 6, is minimized. Minimizing this width means that multiple actuators can be placed on an aerodynamic surface as closely spaced as possible. The limitation on how small the width should be made is that the electric field on the upstream edge must be kept low enough to inhibit plasma formation on the upstream edge. We find this limit to be $L_1$ equal to or greater than 0.1 inch.

Figure 7:
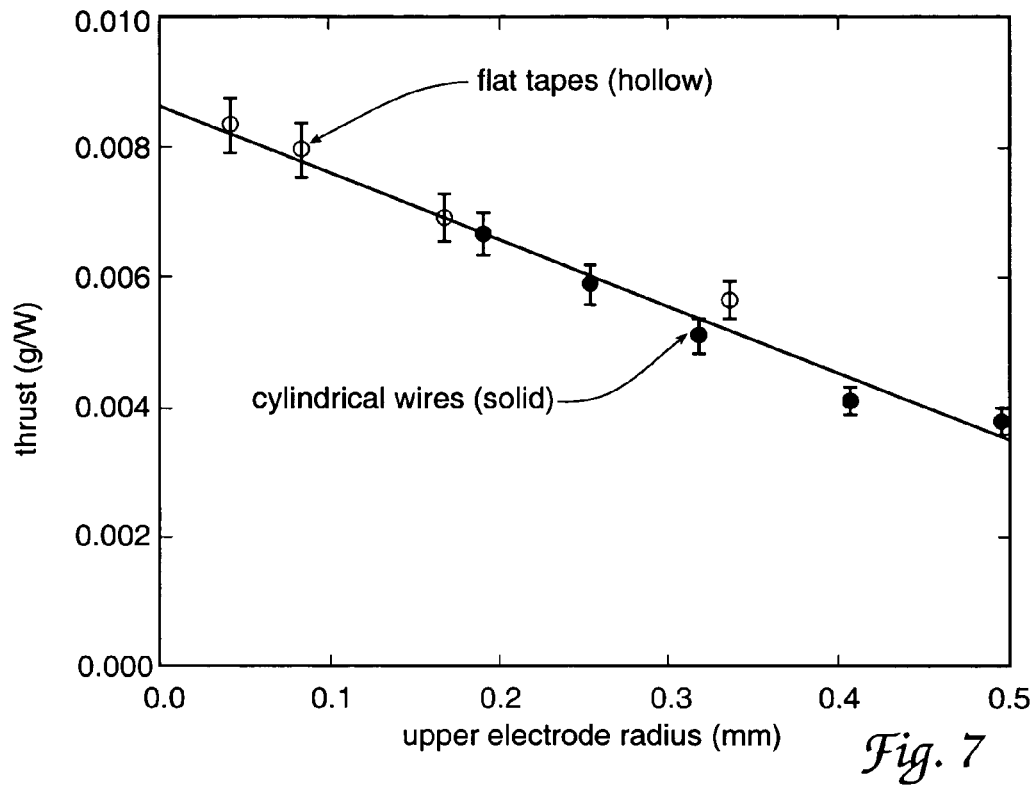
FIG. 7 shows response of a present invention apparatus to component element dimensional change.

As shown in detail in our and our colleagues' paper titled "Mechanisms and Responses of a Single Dielectric Barrier Plasma" by C. L. Enloe, T. E. McLaughlin, R. D. VanDyken, K. D. Kachner, E. J. Jumper, and T. C. Corke, presented at the 41st Aerospace Sciences Meeting & Exhibit, Reno, Nev., on Jan. 8, 2003, and available from the American Institute of Aeronautics and Astronautics as paper AIAA 2003-1021, the majority of the electric force on the plasma occurs near the edge of the exposed electrode, and the magnitude of this force becomes greater as the thickness of the electrode is reduced. This paper also shows that the electrostatic pressure description given by Sherman et. al. in U.S. Pat. No. 6,200,539 is only an approximation and is insufficient to describe the action of the present invention actuator in all operating regimes. The theoretical predictions described in this paper have been borne out by the experimental measurements involving the radius of electrode 606 and the generated thrust shown in the FIG. 7 drawing. The conclusion is that in constructing the Actuator, the optimum configuration is one in which the thickness, $d_1$, of the exposed electrode 606 as shown in FIG. 6 is minimized. The only limitation on the minimum thickness of the exposed electrode is that imposed by the particular manufacturing technique used to fabricate the actuator.

Figure 8A:
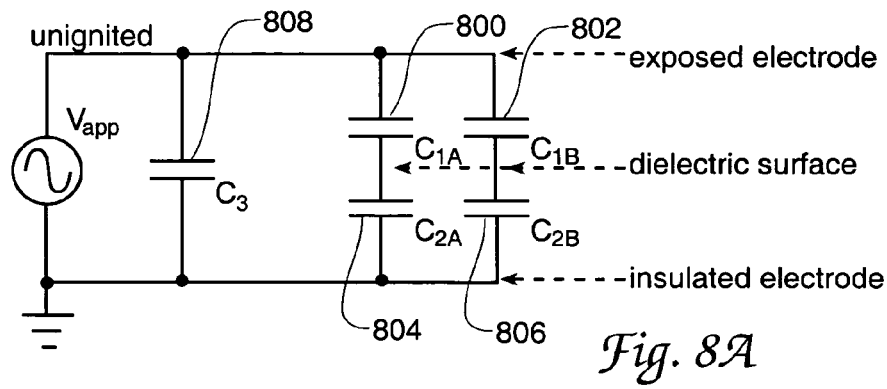
FIG. 8 includes the views of FIG. 8A and FIG. 8B and shows equivalent electrical circuits for a present invention device in two differing operating conditions.
Figure 8B:
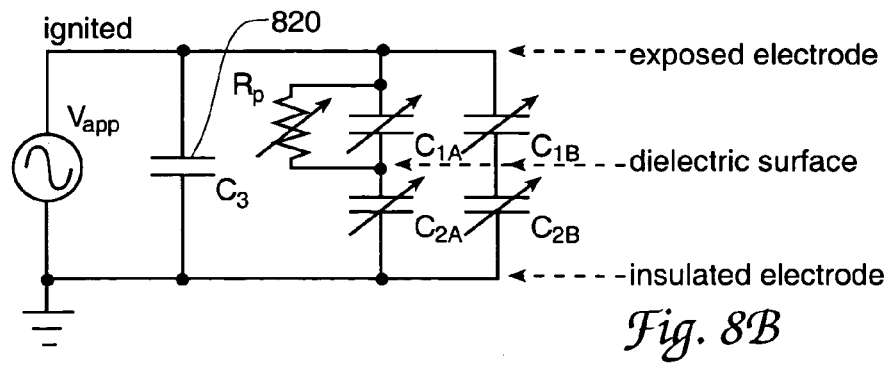

The plasma discharge in the FIG. 6 actuator occurs between the exposed electrode 606 and the surface 610 of the dielectric material. As a result of this mechanism the electrical characteristics of the Single Dielectric Barrier Aerodynamic Plasma Actuator of the present invention may be understood as a system of coupled capacitances, as are shown in the views of FIG. 8A and FIG. 8B of the FIG. 8 drawing. These capacitors include capacitors 800 and 802, i.e., $C_{1A}$ and $C_{1B}$, between the exposed electrode and the dielectric surface (which forms a virtual electrode), the capacitors 804 and 806, i.e., $C_{2A}$ and $C_{2B}$, between the dielectric surface and the encapsulated electrode, and the capacitor 808, i.e., $C_3$, directly between the two physical electrodes. During the discharge, a portion of the capacitance between the exposed electrode and the dielectric surface is shunted by the conductivity of the plasma as is represented by the resistance 820 appearing in the FIG. 8B drawing of an ignited actuator. The fraction of the capacitance that is shorted varies during the discharge cycle, as the dimension of the plasma develops. In FIG. 8 we distinguish between the portion of the lumped capacitance that is affected by the extent of the plasma at any particular time by the individual capacitances $C_{1A}$, $C_{1B}$ and $C_{2A}$, $C_{2B}$. At all times, $C_{1A}+C_{1B}$ a constant=$C_1$, and $C_{2A}+C_{2B}$ a constant=$C_2$. Since only the electric field attending the plasma envelope (110, 114 and 116 etc. in FIG. 1) has bearing on the force of the plasma, the thickness, $d_3$, of the dielectric material shown in the FIG. 6 drawing may be as great as necessary to avoid breakdown through the dielectric material without sacrificing performance of the actuator. It is therefore possible to keep the electrical field in the dielectric material well below the breakdown strength of the material without sacrificing actuator performance.

Understanding that the plasma actuator in fact involves a dielectric barrier discharge phenomenon makes it possible to analyze the discharge with a lumped-element circuit model. The key to building such a model lies in appreciating that in addition to the two physical electrodes in the actuator, the exposed surface of the dielectric acts as a virtual electrode as it collects charge. Because, as we have shown in the previous section, the air stream lengthwise or chordwise extent of the plasma changes during the discharge, the values of $C_{1A}$ and $C_{2A}$ change as well. It is useful to consider the average capacitance values for these elements and to realize that this average depends on the amplitude of the applied voltage. Since the FIG. 6 electrodes are offset it is also necessary to include the capacitance C3 in the used model since some field lines connect the physical electrodes directly; C3 provides a parallel path for additional displacement current in the circuit but does not affect the discharge itself.

The plasma, shown as a resistance $R_p$ in the FIG. 8 circuit model, is the single dissipative element in the actuator circuit. The plasma does not exist during the entire discharge, so we indicate $R_p$ as a variable resistance value. When the absolute value of the potential difference across $C_1$ exceeds a threshold value, the plasma ignites, and the resistance $R_p$ drops from an effectively infinite, open-circuit value, to a lower value. When the absolute value of the potential difference falls below another threshold, the discharge quenches and $R_p$ returns to its open-circuit value. The voltage source $V_{AC}$ is, by the nature of the dielectric barrier discharge plasma, an alternating current source in order for the discharge to be sustained.

Figure 25:
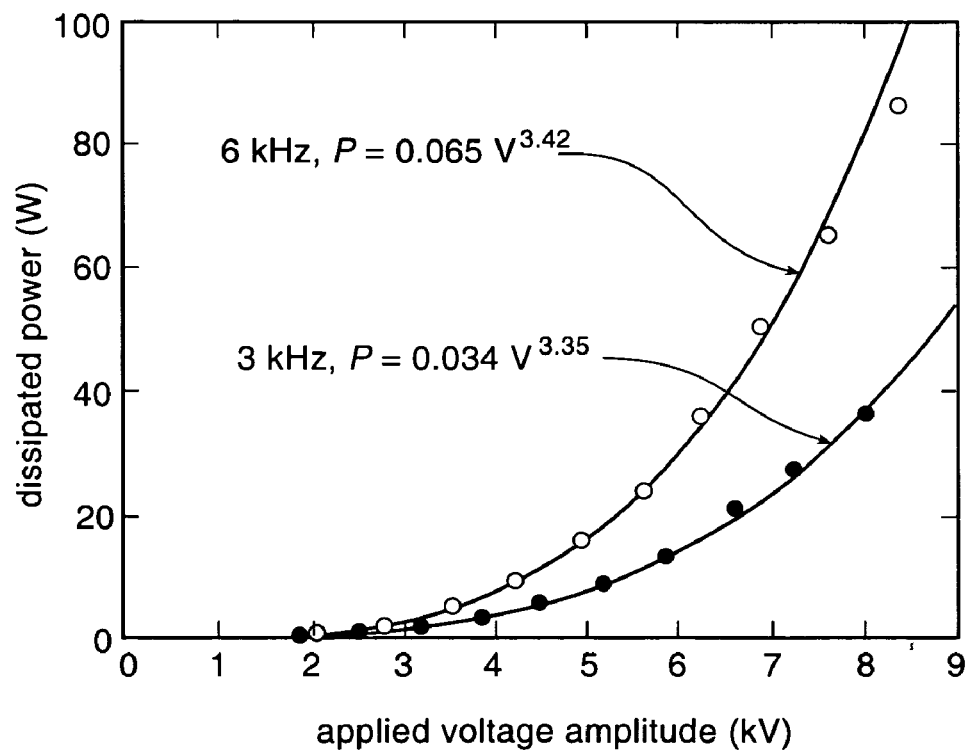
FIG. 25 shows a power dissipated versus applied voltage relationship for a present invention plasma actuator apparatus.

Finally, we note that the power dissipation as a function of amplitude of the applied voltage is consistent with the morphology of the plasma previously noted. As FIG. 8 shows, when the plasma ignites and effectively shorts out the capacitance $C_{1A}$, it forms one part of a voltage divider circuit. The impedance $Z_2$ of the other element of this divider, the capacitance $C_{2A}$, depends on the frequency of the applied waveform, $Z_2=-i/\omega C_2$, but for a fixed frequency we would expect the power dissipated to go as $V_{AC}^2$ if $C_2$ is constant. As FIG. 25 shows, however, power dissipated in the plasma varies approximately as $V_{AC}^{7/2}$. This is consistent with one or both of two situations: 1) an average capacitance $C_2$ that increases with increasing applied voltage, or 2) an average resistance $R_1$ that decreases with increasing applied voltage. As we have seen from the discussion in the previous topic of this document however, the higher the voltage, the faster the plasma sweeps over the surface of the dielectric, meaning that the average area of the virtual electrode atop the dielectric, and hence the value of the capacitance $C_2$, increases with increasing $V_{AC}$. In numerical simulations of the circuit, in order to reproduce the output waveforms with reasonable fidelity it is necessary to introduce a variable resistance that decreases with voltage just as these power traces imply. Reference 20 in the Appendix also discusses this area.

Figure 9:
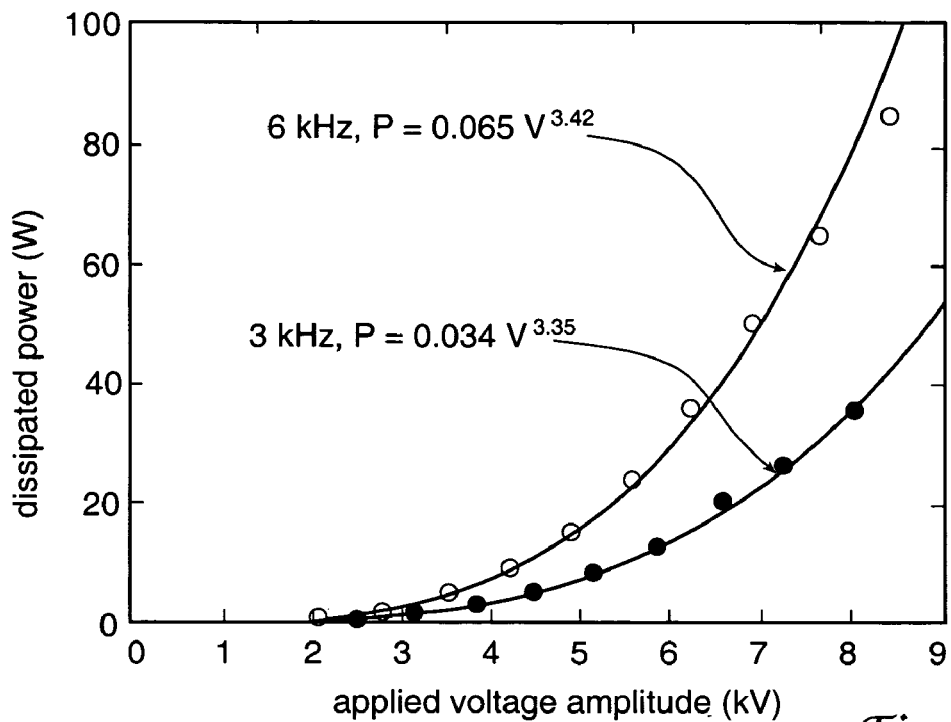
FIG. 9 shows a relationship between applied voltage and power dissipation for a present invention apparatus.
Figure 10:
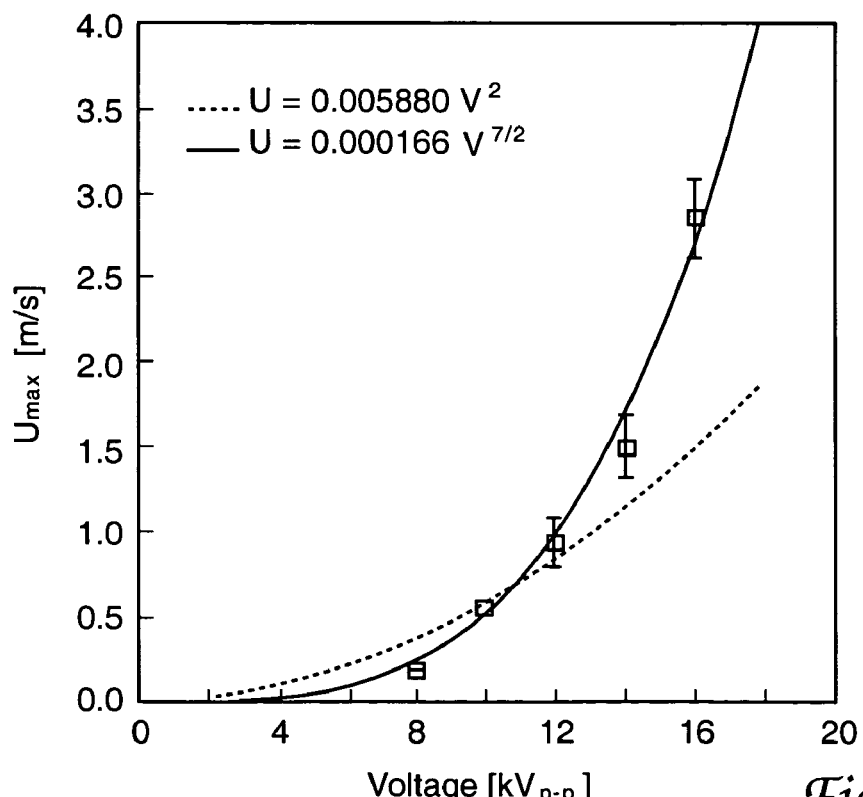
FIG. 10 shows a relationship between applied voltage and achieved plasma velocity in a present invention apparatus.

By way of reiteration, since the physical extent of the plasma varies during the discharge cycle, as is shown by the envelopes 110, 114 and 116 etc. in FIG. 1, the electrical parameters of the actuator also vary during the cycle. These variations relate to the voltage drop across the plasma in a non-linear way. The result is that the power dissipated in the actuator circuit varies with respect to applied voltage approximately as $V^{7/2}$. A relationship of this nature is shown graphically in the FIG. 9 drawing where V is the amplitude of the applied voltage waveform. As shown in FIG. 9 the dissipated power is also a function of the alternating current frequency and varies as a non fixed exponent of the applied voltage when frequency is changed. The FIG. 9 relationship is in contrast with the $V^2$ proportionality relationship that may occur in a purely capacitive or other circuit with fixed elements. The velocity induced by the actuator in the surrounding air also follows this same proportionality, as is shown in the FIG. 10 drawing. This means that the performance of the actuator can be increased non-linearly by increasing the amplitude of the applied voltage. This understanding is significant to scaling the actuator performance up for use in higher, technologically relevant, flight speeds and in fact makes such scaling feasible.

Figure 11:
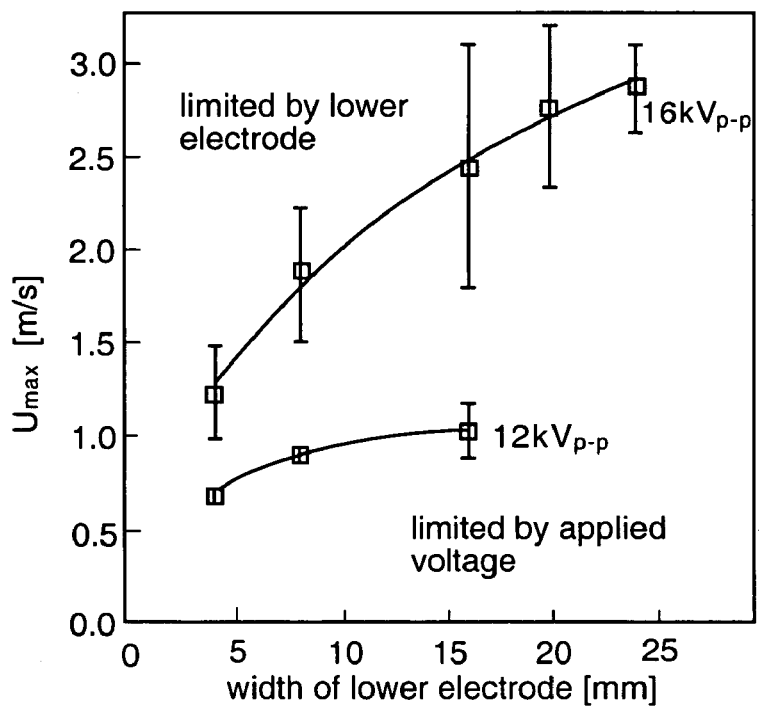
FIG. 11 shows a relationship between electrode size and achieved plasma velocity in a present invention apparatus.
Figure 12:
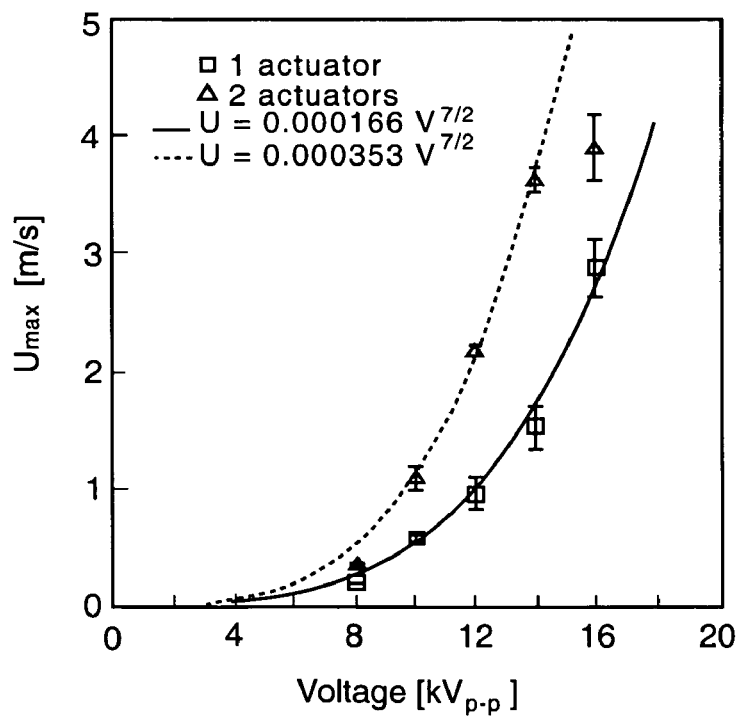
FIG. 12 shows a relationship between number of actuators and achieved plasma velocity for a present invention apparatus.

The extent of the actuator plasma is limited by the width, $L_2$, of the encapsulated lower electrode as is shown in FIG. 11. Although the plasma expands as the discharge is maintained, it will not extend more than a few millimeters past the edge of the encapsulated electrode. When this edge is reached, the performance of the actuator is limited, as is shown in the upper drawing of FIG. 11. Therefore, one requirement for optimizing actuator performance is that the width, $L_2$, of the FIG. 6 encapsulated electrode must be sufficient to preclude limitation of plasma expansion during discharge. FIG. 12 in the drawings shows the effects of multiple actuators is additive. Therefore, another requirement for optimizing a system of actuators is that the width, $L_2$, of the encapsulated electrode should be no longer than the expansion length of the plasma. Typical dimensions, that may of course be altered depending on the observed plasma expansion rates, are $L_2=0.25$ inch for applied peak-to-peak voltages up to 10 kilovolts, $L_2=0.50$ inch for applied peak-to-peak voltages between 10 kilovolts and 14 kilovolts, and $L_2=1.0$ inch for applied peak-to-peak voltages between 14 kilovolts and 18 kilovolts.

Figure 17:
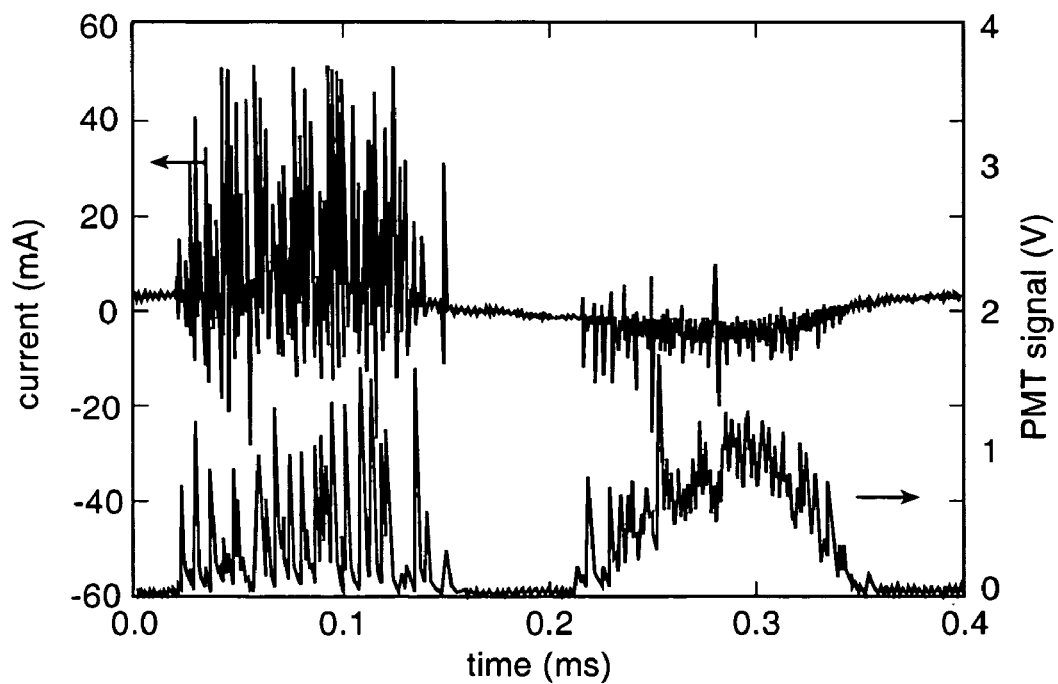
FIG. 17 compares plasma light emission from positive and negative going voltage waveform portions.

The FIG. 13 achieved optical measurements indicate there is considerable macroscopic structure span wise in the dielectric barrier discharge plasma discharge; this is distinct from the microstructure that is characteristic of the dielectric barrier discharge as may be concluded from the material of references 10 through 17 in the Appendix hereof. In fact although it is true that there are certain "hot spots" in the dielectric barrier discharge where the local electrical field is enhanced due for example to sharp irregularities in the electrodes, and therefore plasma is easier to produce in some locations, even at these locations the self-limiting behavior of the dielectric barrier discharge applies. FIG. 17 in the drawings shows one discharge cycle of the plasma actuator with a sinusoidal applied voltage waveform. Both the current through the discharge and the emitted light are shown in FIG. 17. The FIG. 17 drawing shows that the discharge is much more irregular in the positive-going half cycle than in the negative-going half. Such behavior is consistent with data in the literature for a dielectric barrier discharge with a single dielectric barrier, see references 12 and 17, although it is not widely noted—see, for example, comments by Gibalov et. al. in reference 12.

Figure 18:
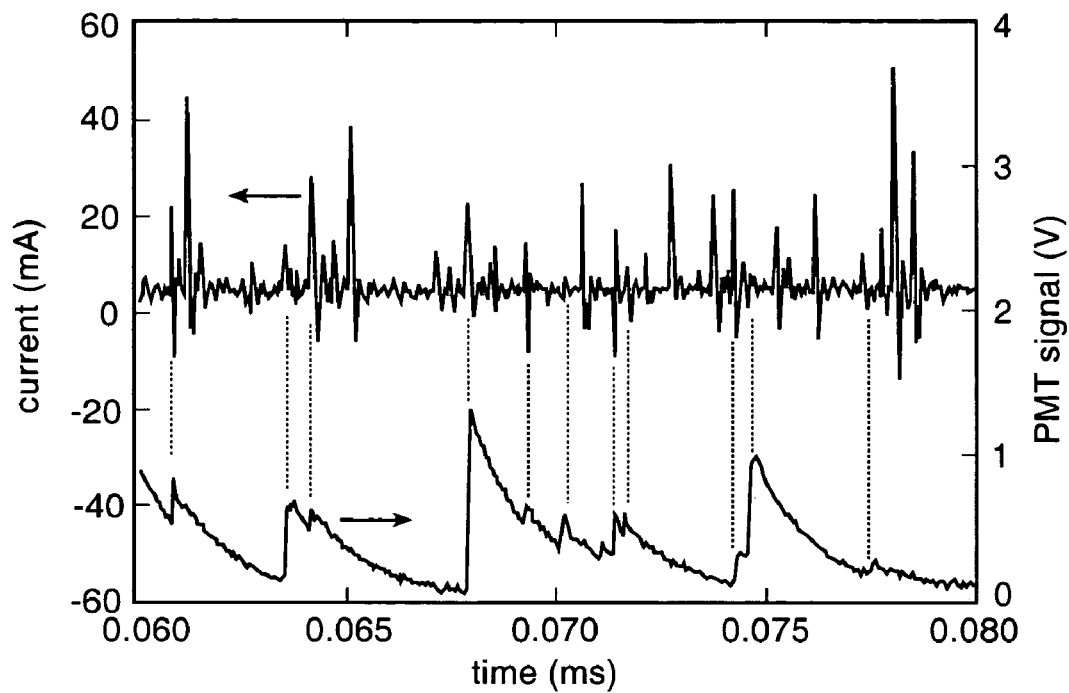
FIG. 18 shows a simultaneous view of light emission and current flow for a plasma according to the present invention.

Zooming in on the same data on a finer time scale, see FIG. 18, shows that each pulse of light observed by the photomultiplier tube corresponds to a pulse in the plasma generating current signal. The reverse, however, is not true—not every plasma generating current pulse corresponds to a light pulse. The explanation for this observation is straightforward. The photomultiplier tube field of view is approximately one-third of the plasma actuator. The current monitor, however, "sees" the entire discharge current. Therefore we conclude that there are discharge events (current pulses) that do not occur within the field of view of the photomultiplier tube. When the voltage on the exposed electrode is negative-going, the discharge is relatively uniform across the width of the actuator. When the same voltage is positive-going, however, the discharge is "patchy," perhaps akin to flashbulbs going off in a stadium. This asymmetry in the discharge plays a role in the momentum coupling to the flow, as described in the next section herein.

Wave-Form Dependence

Figure 19:
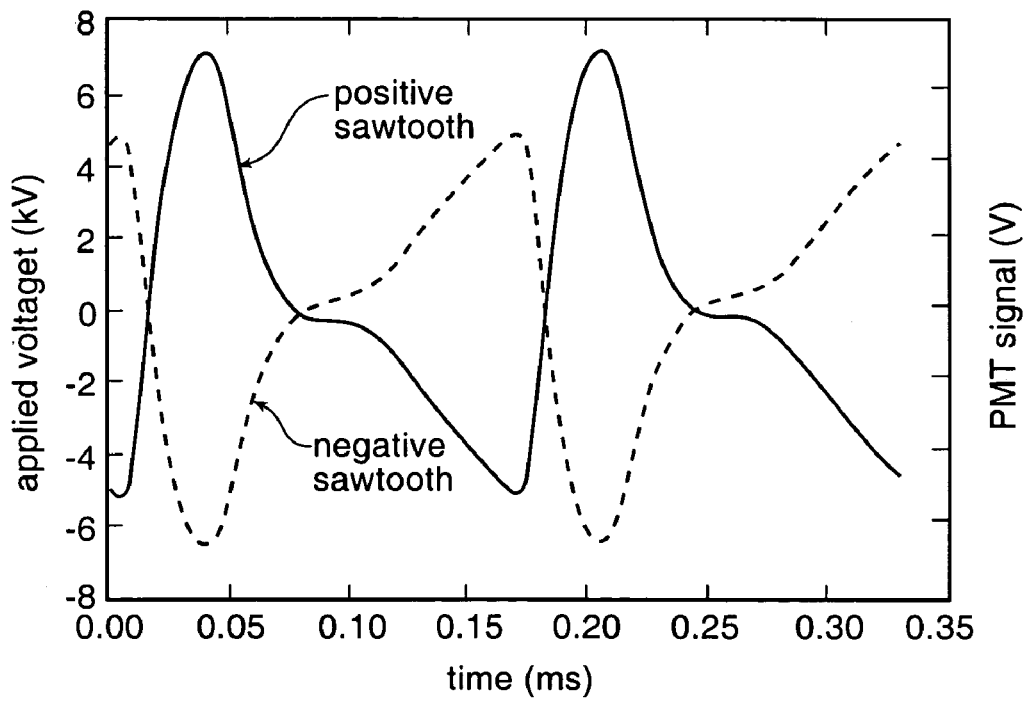
FIG. 19 shows a positive and negative voltage waveform combination useful in consideration of plasma discharge asymmetry.
Figure 20:
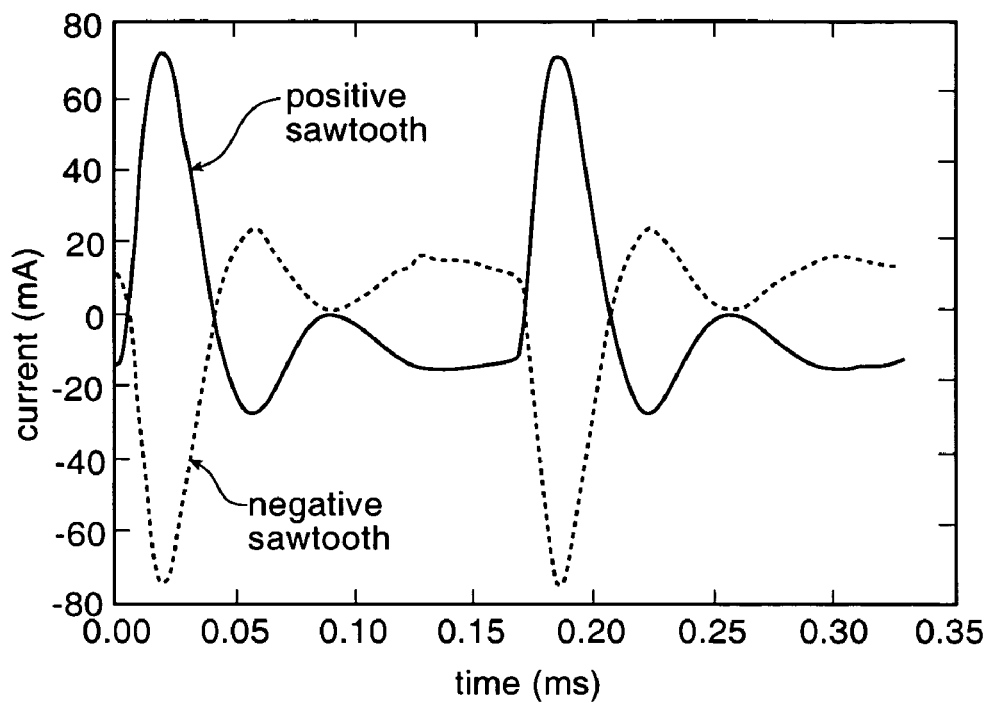
FIG. 20 shows a positive and negative current waveform combination useful in consideration of plasma discharge asymmetry.

Because we know that the spatial structure of the plasma actuator discharge is asymmetric, we can consider the importance of this asymmetry by applying two different asymmetric voltage waveforms, mirror images of each other, to the plasma. Both waveforms are sawtooth waveforms—in one case, the "positive sawtooth," the voltage applied to the exposed electrode, has a large positive slope and a smaller negative slope. The "negative sawtooth" has its faster transition when negative-going and its slower when positive going. We can monitor voltage and current waveforms simultaneously and integrate the power dissipated in the plasma directly from the voltage and current waveforms, each averaged over a number of cycles to average out the noise shown in FIG. 17. FIG. 19 and FIG. 20 respectively show the voltage and current waveforms resulting from this integration.

Figure 21:
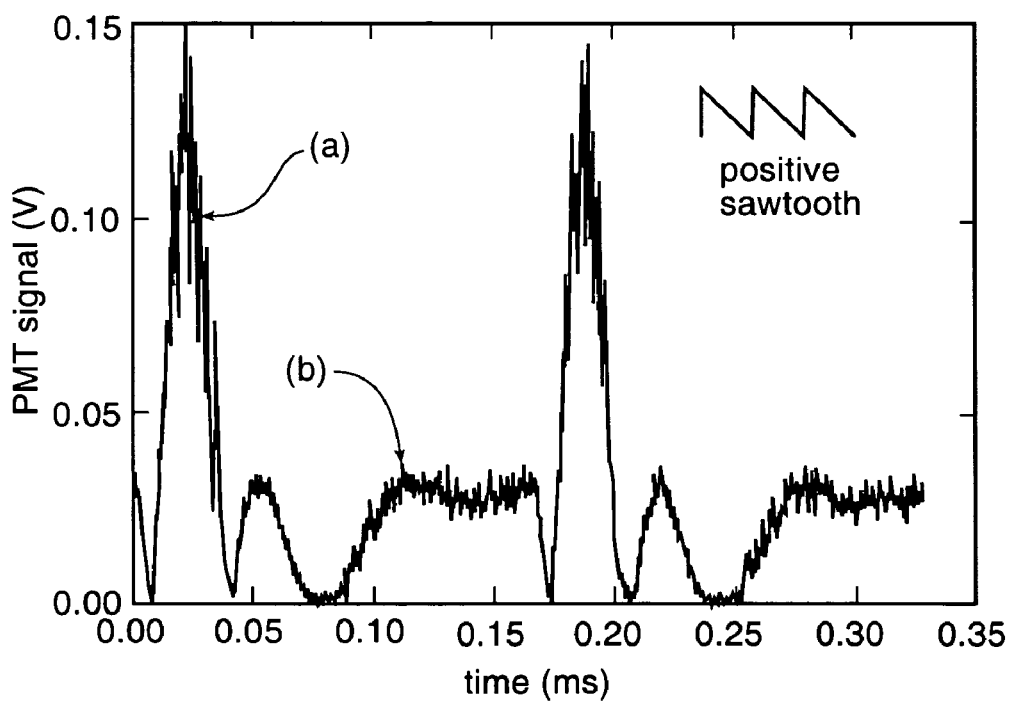
FIG. 21 shows plasma actuator apparatus light emission resulting from a positive sawtooth waveform.
Figure 22:
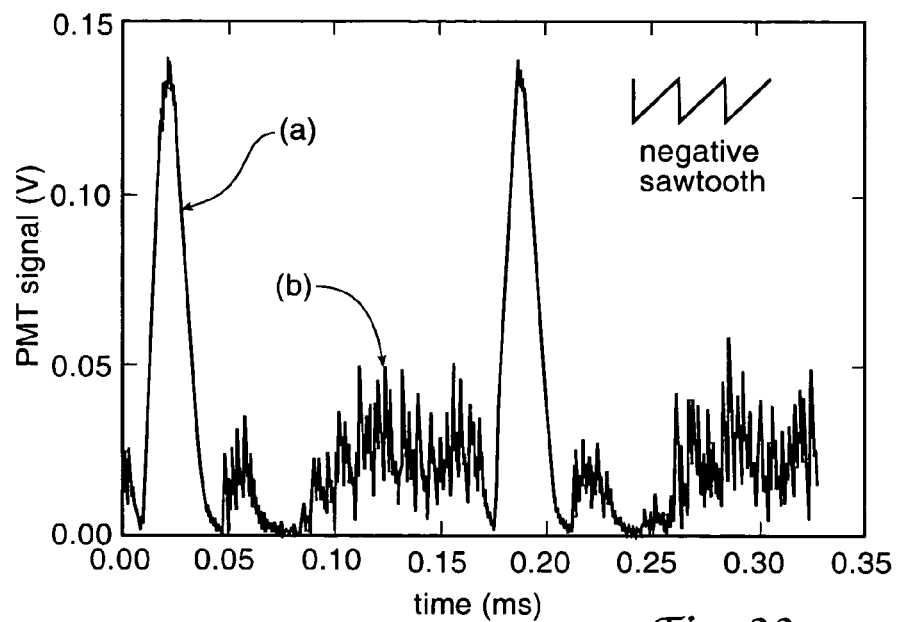
FIG. 22 shows plasma actuator apparatus light emission resulting from a negative sawtooth waveform.

On a gross scale, the light emission from the plasma in each FIG. 19 and FIG. 20 case, as is shown in FIG. 21 and FIG. 22, seems to reflect the fact that the shape of the positive- and negative-sawtooth waveforms are essentially the same. If we look in detail, however, we see that the asymmetry of the discharge noted earlier also appears in these measurements. For each waveform, the negative-going portion of the waveform, FIG. 21(*b*) and FIG. 22(*a*), produces the more uniform discharge. The positive-going portion FIG. 21(*a*) and FIG. 22(*b*) produces the more irregular discharge as is consistent with the results shown in FIG. 14.

Figure 23:
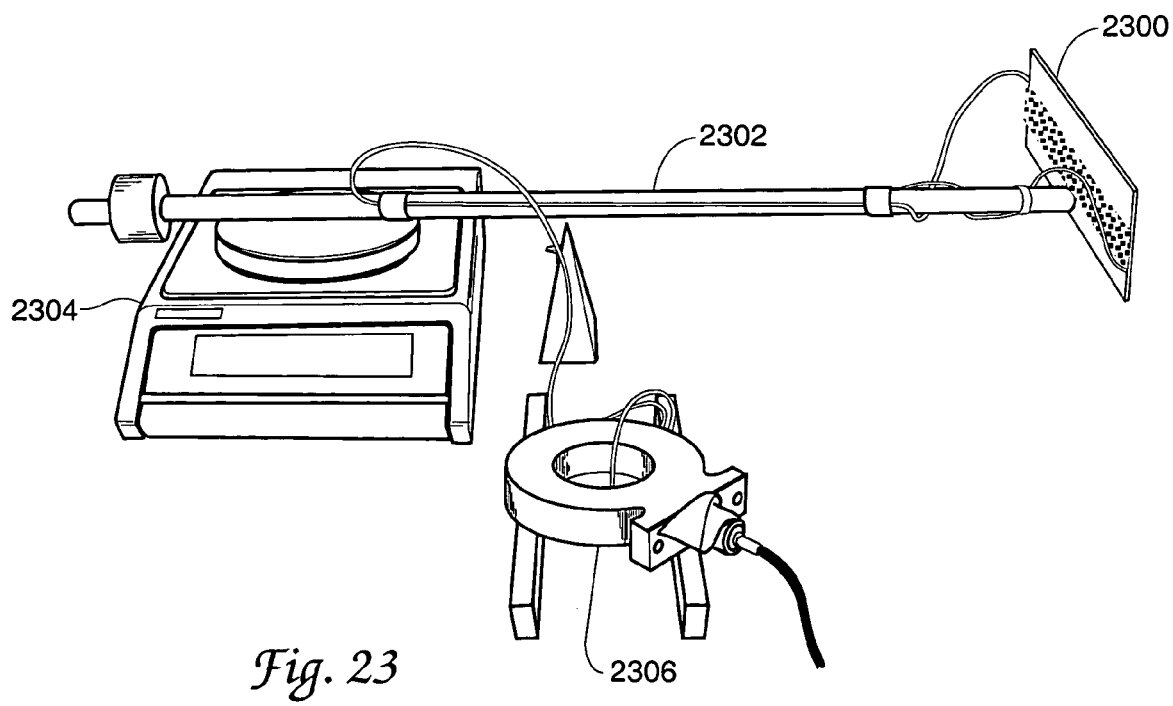
FIG. 23 shows a current and thrust measurement arrangement useful in evaluating a plasma actuator apparatus.
Figure 24:
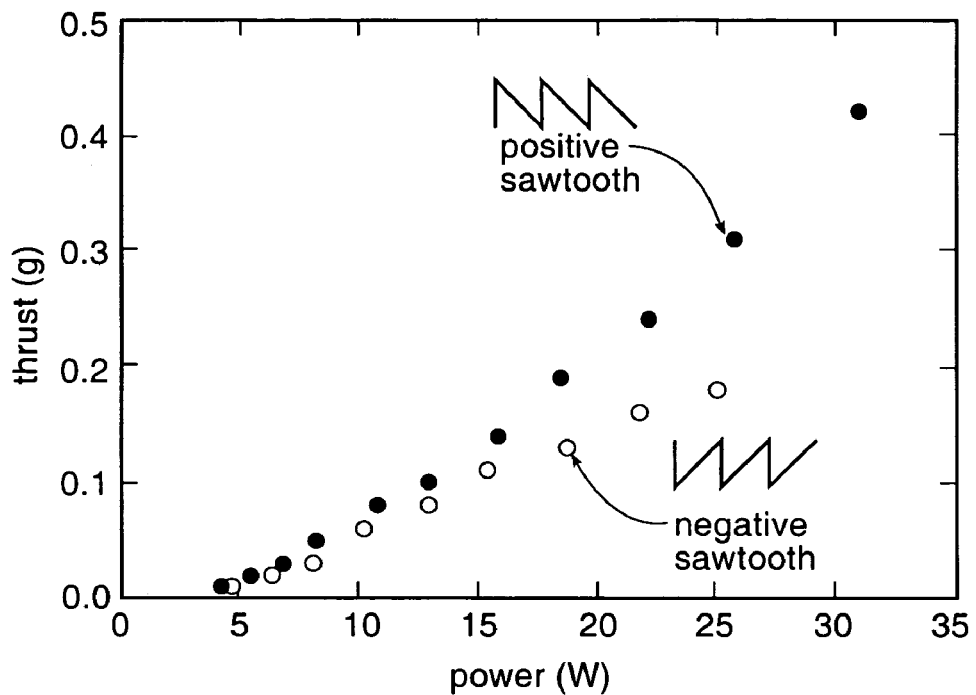
FIG. 24 shows relationship between generated thrust and dissipated power for positive and negative sawtooth voltages.

The importance of the difference in the structure of these two plasmas is evident when we measure the effect that each has on the surrounding air. We may gauge the actuator's effectiveness by measuring the thrust it produces when operated in initially still air. An arrangement used to make this measurement is shown in FIG. 23. In FIG. 23 the actuator 2300 is mounted on a counter weighted lever arm 2302 and the thrust it produces is measured on a mass balance 2304 located at the actuator-opposite end of the arm. Actuator current and waveform are sampled by way of a torrodial magnetic field sense coil or transformer shown at 2306 in FIG. 23. One theory of operation for the plasma actuator attributes its effect to a heating of the air. If this theory is correct, then either polarity of the sawtooth waveform should be equally effective, given the same average power dissipated by the plasma. In fact however, this is not the case. FIG. 24 shows the relationship between thrust and dissipated power for both the positive and negative sawtooth waveforms. As shown in this drawing, there is a considerable difference between the thrust developed with these two waveforms. The positive-sawtooth waveform, which has a higher negative-going duty cycle and therefore produces a more diffuse plasma for a greater fraction of the discharge cycle, produces the greater thrust. The negative-sawtooth waveform, in contrast, produces a more irregular plasma for a greater fraction of the discharge cycle, and is less efficient in coupling momentum into the actuator airflow for a comparable dissipated power. Therefore, we can disregard bulk heating as the primary mechanism of the operation of the plasma actuator.

Aerodynamic Forces Produced by the Plasma Actuator

The direct measurement of thrust from the plasma actuator, although a simple measurement, is also instructive in terms of illuminating the mechanism involved in the actuator. In order to measure a tangible actuator thrust using a mass balance, as shown in FIG. 23, there must exist a mechanical coupling between the moving air and the actuator. Since this coupling occurs only when plasma is present, we can infer that the generated plasma is the force-enabling intermediary. The way that the plasma can couple force into the actuator is via electric field interactions with the charged particles in the plasma. Essentially, the charges in the plasma "push" on both the background gas and the image charges in the electrodes, completing the chain of forces leading to a generation of measurable thrust.

We have asserted that although the structure of the plasma is different in each half-cycle of the dielectric barrier discharge in the plasma actuator, it is not this asymmetry that appears to drive the direction of the induced airflow, as Shyy has suggested in Appendix reference 19. In order to further confirm this, we can apply sawtooth waveforms to a different configuration of electrodes, as are shown in FIG. 26. In this case, the electrodes are made of insulated magnet wire, so that unlike the configuration shown in FIG. 6 herein, neither electrode is the preferential electron emitter. The geometric asymmetry in the arrangement is however maintained.

With both electrodes encapsulated, the FIG. 26 arrangement of the plasma actuator is much less efficient in producing plasma and therefore in producing thrust; it is therefore not feasible to measure thrust directly in the manner shown in FIG. 23. Instead, smoke may be used as a flow visualization tool, achieving the results shown in FIG. 27. In FIG. 27 the FIG. 26 electrodes are arranged vertically and the electrode polarizations reversed between the two views. As the smoke patterns 2700 and 2702 of FIG. 27A and FIG. 27B respectively in FIG. 27 show however, the direction of induced airflow is the same—to the right—regardless of the polarity of the waveform applied. Therefore, it is clearly the geometry of the electrodes that determines the direction of the actuator generated plasma flow.

With the FIG. 26 asymmetric arrangement of electrodes, the electric field is similarly highly structured in nature even in the absence of plasma. Because of the mobility of the generated charges (ions and electrons) once the plasma ignites, it will further enhance asymmetries in the electric field structure. In general, the full effect of having the plasma present requires detailed calculations, but some insight can be gleaned by considering a specific case of an asymmetric electrode arrangement.

Debye Shielding in Plasmas

In understanding the operation of the present invention plasma actuator, it is useful to understand how the plasma modifies the electric field that is otherwise present when the air between the electrodes is not ionized. Without ionization, the relative dielectric constant of the air is effectively the same as that of a vacuum, $\varepsilon_r = 1$. Because charges in a plasma are free to move, they arrange themselves so as to cancel as much of the field as possible within the plasma volume. Thermal motion of the particles causes this cancellation to be incomplete near the boundaries of the plasma. Assuming a timescale long enough for the charges to redistribute themselves, we can relate the electron density $n_e$ and the ion density $n_i$ in the plasma to the local electric potential $\phi$ by the Boltzmann relation, $$n_{i,e} = n_0 \exp\left(\mp \frac{e\phi}{kT_{e,i}}\right) \approx n_0\left(1 \mp \frac{e\phi}{kT_{e,i}}\right) \quad (1)$$

where $n_0$ is the background plasma density and T is the temperature of the particular species. In Equation (1), the upper (minus) sign applies to the plasma ions, while the lower (plus) sign applies to the electrons. The net charge density at any point in the plasma is $$\rho = e(n_i - n_e) = -en_0\left(\frac{e\phi}{kT_i} + \frac{e\phi}{kT_e}\right) \quad (2)$$

From Maxwell's equations, and from the fact that the electric field $\vec{E}$ is related to the potential $\phi$ by $\vec{E} = -\vec{\nabla}\phi$, we have $$-\nabla^2 \phi = \frac{\rho}{\varepsilon_0} \quad (3)$$

Using Equation (3) in Equation (2), we have $$\nabla^2 \phi = \frac{e^2 n_0}{\varepsilon_0}\left(\frac{1}{kT_i} + \frac{1}{kT_e}\right)\phi = \frac{1}{\lambda_D^2}\phi \quad (4)$$

where we have now defined the Debye length $\lambda_D$ by $$\frac{1}{\lambda_D^2} = \frac{e^2 n_0}{\varepsilon_0}\left(\frac{1}{kT_i} + \frac{1}{kT_e}\right) \quad (5)$$

The Debye length is the characteristic length for electrostatic shielding in a plasma—for lengths greater than $\lambda_D$ the plasma shields external potentials. This also means that the net charge density at any point in the plasma is proportional to the potential, $$\rho = -\frac{\varepsilon_0}{\lambda_D^2}\phi \quad (6)$$

Equation (6) implies that substantial charge imbalances exist in the plasma only where the unshielded potentials exist—near the boundaries.

The Electric Potential with Asymmetric Electrodes

Equation (4) is generally not solvable in closed form except for a few special cases. The simplest case, that of a slab of plasma between plane parallel electrodes (the so-called "plasma capacitor") is treated in most elementary plasma textbooks. Another electrode geometry amenable to a closed-form solution is that of a plasma between concentric cylindrical electrodes of inner radius, a and outer radius, b. This geometry, although not an exact match to the plasma actuator, is germane because the electrodes are geometrically very different in area, as are those of the actuator.

Effectively, it is a plasma actuator wrapped into a mathematically tractable form.

Equation (4) in cylindrical geometry is $$\frac{1}{r}\frac{\partial}{\partial r}\left(r\frac{\partial \varphi}{\partial r}\right) = \frac{1}{\lambda_D^2}\phi \qquad (7)$$

This is a boundary-value problem, and we set the boundary conditions such that the electric potential φ(r) is φ(a)=φ$_a$ at the inner electrode, and φ(b)=φ$_b$ at the outer electrode. The solution is then a sum of the hyperbolic Bessel functions $I_0$ and $K_0$, given by $$\phi(r) = C_1 I_0\left(\frac{r}{\lambda_D}\right) + C_2 K_0\left(\frac{r}{\lambda_D}\right) \qquad (8)$$

where the constants $C_1$ and $C_2$, chosen to satisfy the boundary conditions, are given by $$C_1 = \frac{\left\{\phi_a - \phi_b\left[\frac{K_0(a/\lambda_D)}{K_0(b/\lambda_D)}\right]\right\}K_0(b/\lambda_D)}{I_0(a/\lambda_D)K_0(b/\lambda_D) - I_0(b/\lambda_D)K_0(a/\lambda_D)} \qquad (9)$$

and $$C_2 = \frac{\phi_b - C_1 I_0(b/\lambda_D)}{K_0(b/\lambda_D)} \qquad (10)$$

Another condition on the solution is that the plasma maintains charge neutrality (in other words, since the air was initially neutral before it was ionized, ionization creates no net electric charge) so integrated over its volume V, $$\int \rho dV = 0 \qquad (11)$$

Using Equation (6) in Equation (11), the neutrality condition implies that $$0 = -2\pi \frac{\varepsilon_0}{\lambda_D^2} \int_a^b r\phi(r)dr \qquad (12)$$

Applying this condition to the solution defined by equations (8) through (10) yields, $$0 = C_1 b I_1(b/\lambda_D) - C_1 a I_1(a/\lambda_D) - C_2 b K_1(b/\lambda_D) + C_2 a K_1(a/\lambda_D) \qquad (13)$$

Figure 28:
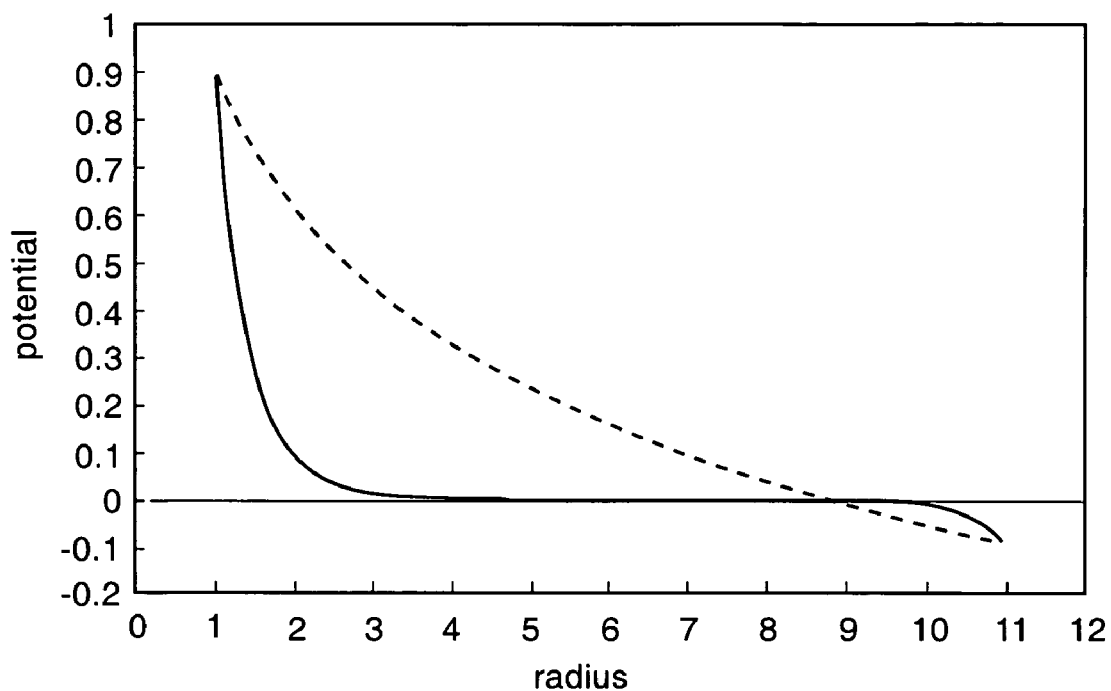
FIG. 28 shows a relation between potential and radius in a plasma capacitor.

Equations (8), (9), (10), and (13), then, define the solution to Debye shielding in a cylindrical plasma capacitor. To gain confidence in the validity of this mathematical description, we can evaluate the solution in several limiting cases to test its validity. As an example, we take the case in which we have the inner radius normalized and inter-electrode gap much larger than the radius of the inner electrode, a=1, b−a=10. We also normalize the potential difference between the electrodes, so that φ$_a$−φ$_b$=1. With the plasma present, we set the Debye length much shorter than the inter-electrode gap, λ$_D$=0.5. The requirements of charge neutrality, given in Equation (13), lead us to set φ$_a$=0.9 and φ$_b$=−0.1. The solution is shown by the solid line in FIG. 28. The shielding properties of the plasma are evident—the potential in the plasma is zero except near the inner and outer boundaries.

Figure 29:
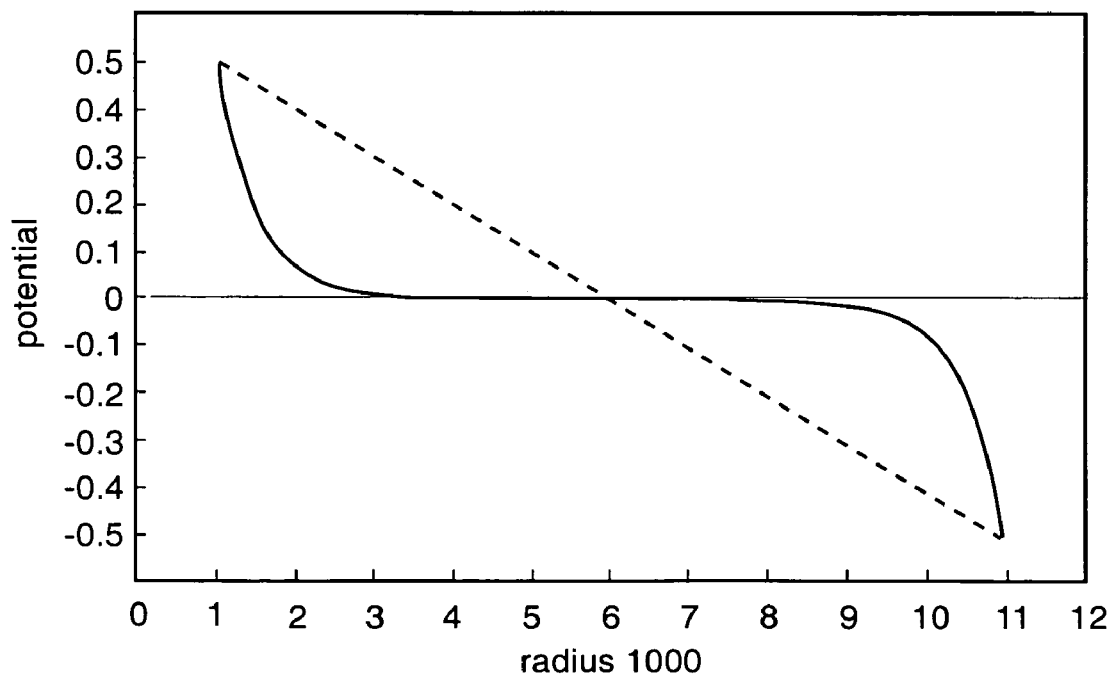
FIG. 29 shows two results of a large radius plasma investigation.

To check the solution, we can "remove" the plasma by setting the Debye length to a very large value (consistent with setting the plasma density no to zero in Equation (5)). This limit is shown as the dashed line in FIG. 28. It is also the same result that one achieves applying the well-known solution for the potential between two cylindrical electrodes in a vacuum or air, $$\phi(r) = (\phi_a - \phi_b)\frac{\ln(b/r)}{\ln(b/a)} + \phi_b \qquad (14)$$

so that the solution checks out in the limit of no plasma. We can also recover the case of the plane parallel plasma capacitor from this solution by setting the inner radius a large compared to the gap length. Setting a=1000, and keeping b−a=10, we have the result shown in FIG. 29, for the case of plasma present, (solid line) and for the case of plasma absent (dashed line). The latter case is, of course, a linearly decreasing potential consistent with a uniform electric field in the gap. Since this situation is geometrically symmetric, charge neutrality dictates that set φ$_a$=0.5 and φ$_b$=−0.5.

The Electric Field with Asymmetric Electrodes

Since the electric field is just the gradient of the potential, and in this geometry is only in the radial direction, we can solve for the electric field in the gap by taking the derivative of Equation (8), $$E(r) = -\frac{\partial \phi}{\partial r} = -\frac{C_1}{\lambda_D}I_1(r/\lambda_D) + \frac{C_2}{\lambda_D}K_1(r/\lambda_D) \qquad (15)$$

Figure 30:
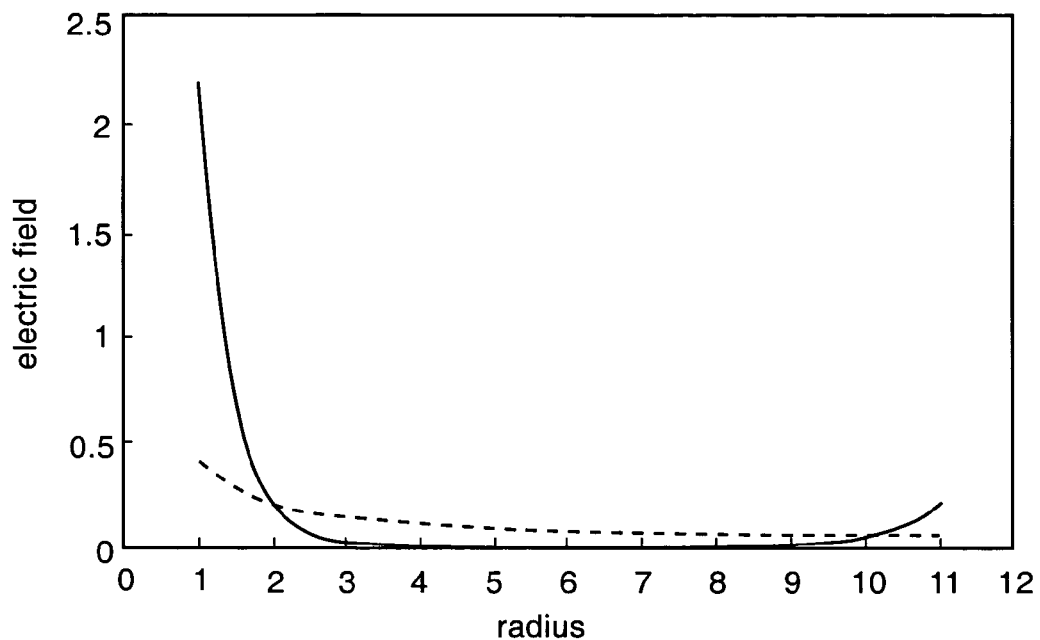
FIG. 30 shows electric field and plasma shielding.

These results, for the same parameters as previously, are shown in FIG. 30 (solid line). The electric field in the bulk of the plasma is effectively shielded, while the electric field hear the boundaries is elevated, compared to the results with plasma absent (dashed line), again found by setting the Debye length to a large value. As before, the results in the absence of plasma agree with the solution in vacuum or air, given by $$E(r) = \frac{\phi_a - \phi_b}{\ln(b/a)}\frac{1}{r} \qquad (16)$$

Although not shown here (the graph is trivial), in the limit of large inner radius the value of the electric field calculated using the cylindrical solution is constant and equal to the potential difference divided by the gap length, consistent with the familiar result for a parallel plate capacitor. This gives additional confidence that the solution is indeed correct.

Electric Forces on the Plasma

Because there is an electric field in the plasma in regions where there is also a net charge density, there will be a force on the plasma. The force density (force per unit volume or "body force" can be calculated directly by taking the electric field times the charge density. Since the charge density is proportional to the potential, however, we can write $$\vec{f} = \rho \vec{E} = -\left(\frac{\varepsilon_0}{\lambda_D^2}\right)\phi\vec{E} \qquad (17)$$

where we choose to use a lower-case f as a reminder that this is a volumetric quantity. In the cylindrical geometry, this force density will be in the radial direction. Since we have expressions for φ and E, we can write a similar expression for the radial component of $\vec{f}$, $$f_r(r) = \frac{\varepsilon_0 C_1^2}{\lambda_D^3} I_0(r/\lambda_D) I_1(r/\lambda_D) - \frac{\varepsilon_0 C_1 C_2}{\lambda_D^3} I_0(r/\lambda_D) K_1(r/\lambda_D) + \qquad (18)$$

$$\frac{\varepsilon_0 C_1 C_2}{\lambda_D^3} K_0(r/\lambda_D) I_1(r/\lambda_D) - \frac{\varepsilon_0 C_2^2}{\lambda_D^3} K_0(r/\lambda_0) K_1(r/\lambda_D)$$

It has been suggested by Roth et. al. in Appendix reference 6 that since the quantity $\varepsilon_0 E^2/2$ has units of energy density that the gradient of this quantity may be taken for the force density or body force. Since we have an explicit expression for $\vec{E}$, we can test this assertion. Since the case we are considering is radially symmetric, we need only consider the radial derivative in calculating the gradient, $$\frac{\partial}{\partial r}\frac{\varepsilon_0}{2} E^2 = \frac{\varepsilon_0 C_1^2}{2\lambda_D^3} I_1(r/\lambda_D)[I_0(r/\lambda_D) + I_2(r/\lambda_D)] + \qquad (19)$$

$$\frac{\varepsilon_0 C_1 C_2}{2\lambda_D^3} I_1(r/\lambda_D)[K_0(r/\lambda_D) + K_2(r/\lambda_D)] -$$

$$\frac{\varepsilon_0 C_1 C_2}{2\lambda_D^3} K_1(r/\lambda_D)[I_0(r/\lambda_D) + I_2(r/\lambda_D)] -$$

$$\frac{\varepsilon_0 C_2^2}{2\lambda_D^3} K_1(r/\lambda_D)[K_0(r/\lambda_D) + K_2(r/\lambda_D)]$$

Figure 31:
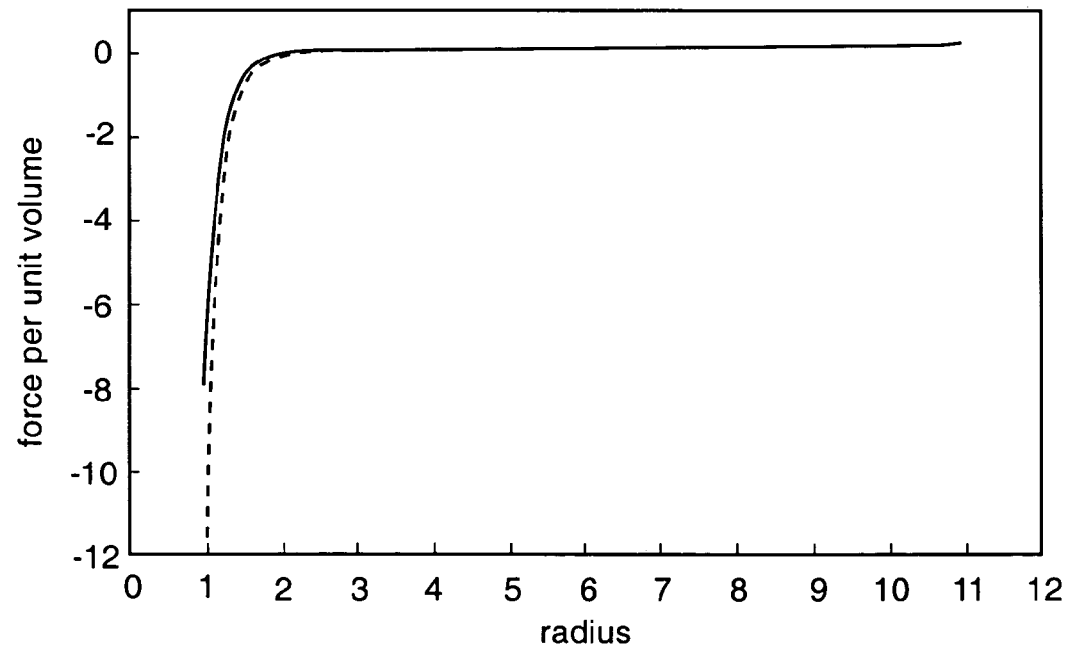
FIG. 31 shows a plasma presence approximation of computed body force.

Using Equations (18) and (19), we can compare these two approaches directly. FIG. 31 shows this comparison for the same case we have considered previously, a=1, b−a=10, $\phi_a-\phi_b=1$, and $\lambda_D=0.5$. The results seem to show substantial agreement for this case, with the calculation of $\varepsilon_0 E^2/2$ predicting a greater force, directed inward, than the direct calculation of f (r).

Figure 32:
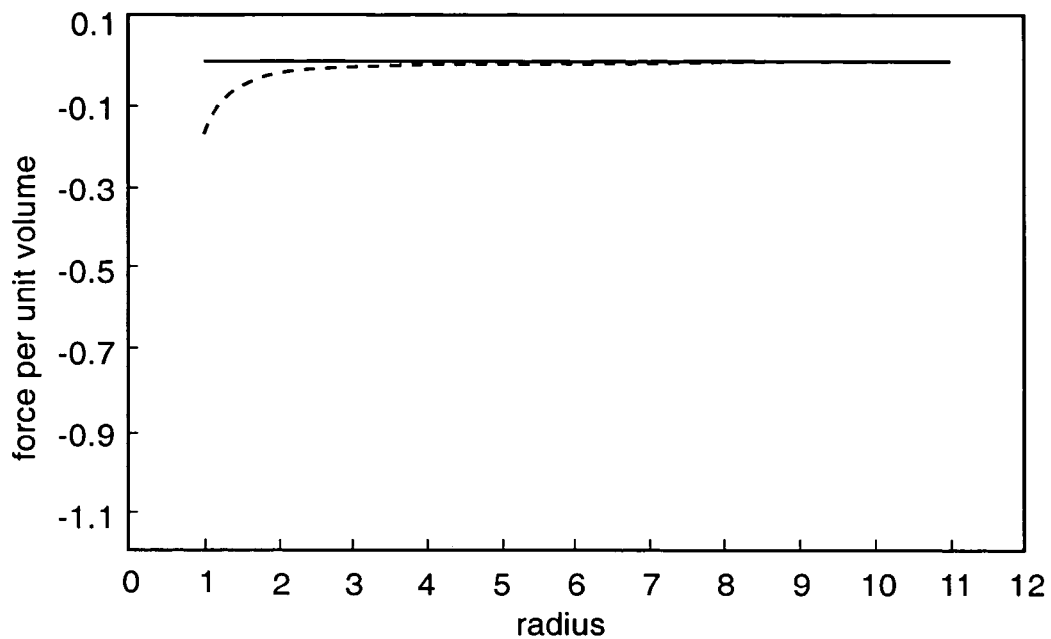
FIG. 32 shows a plasma absent calculation of body force.

In the case of the absence of plasma, however, the two approaches disagree considerably. FIG. 32 shows the calculations for the same parameters as in FIG. 31, except that in this case $\lambda_D \gg$ b−a; in other words, without plasma. With the plasma absent, a direct calculation of the force reveals that there is none—without any charges to push on, the electric field cannot generate a force. It is clear from the formulation of the problem why in the limit attributing a force to the gradient of $E^2$ is incorrect: Even without plasma present, there is still a spatial structure to the E-field and therefore a gradient in $E^2$.

Figure 33:
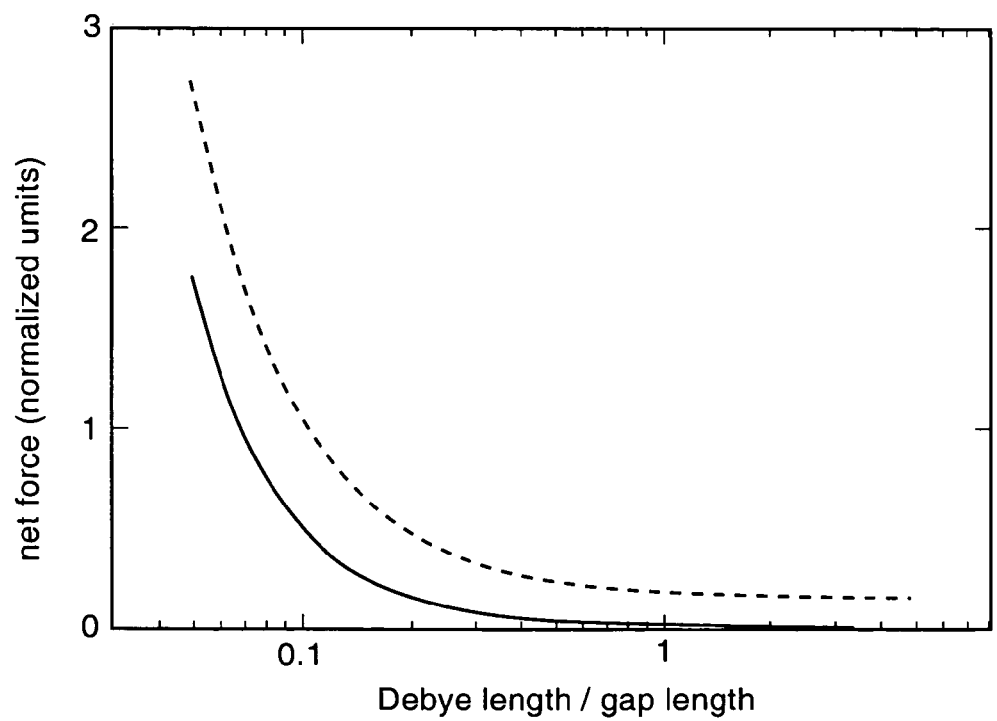
FIG. 33 shows a comparison of two plasma-absent body force calculations.

Another way to compare the two approaches is to integrate the total force on the plasma over the plasma volume. The results of this calculation are shown in FIG. 33. Again, the direct calculation shows that as the plasma goes away, so does the net force. Attributing a force to a gradient in the electric field incorrectly predicts a force even in the absence of plasma.

In the absence of plasma, attributing a body force to the gradient of $E^2$ is incorrect. Doing so in the presence of a plasma, although not an unreasonable approximation, is unnecessary—in order to correctly calculate the E-field, Equation (4) must be solved in detail, from which the charge density and the body force can be calculated directly.

Figure 34:
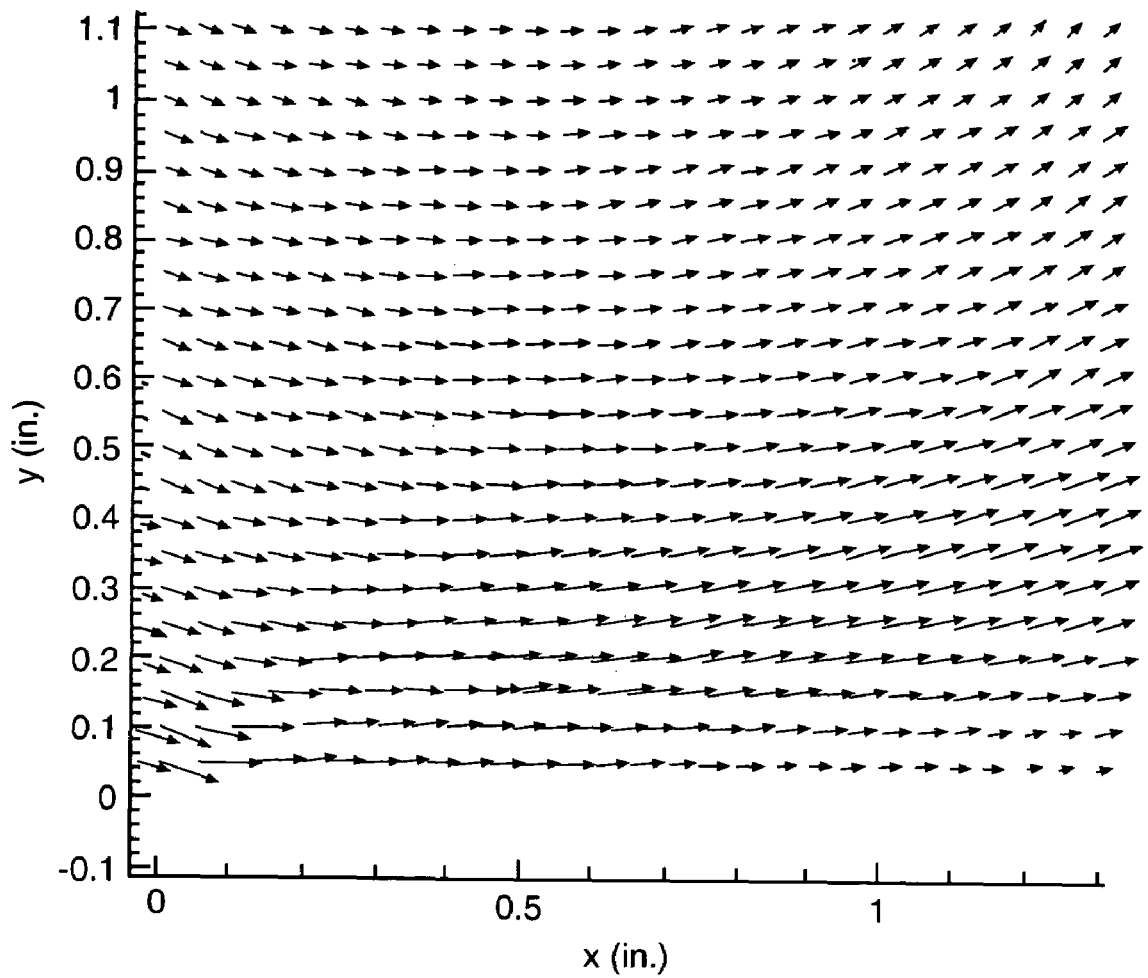
FIG. 34 shows a comparison of two neutral air flow calculations.

The question arises as to why it has been possible to apply the gradient based on the vacuum E-field solution to a Computational Fluid Dynamics simulation with reasonable success, even though this approach is clearly a priori incorrect. (For example, FIG. 34 shows calculated flows based on an input body force calculated from the gradient in the plasma-free solution to $E^2$. These results compare favorably to the observed flows.)

The answer to this dilemma lies in a comparison of the results shown in FIG. 31 to those shown in FIG. 32. Taking the gradient of the vacuum solution results in a body force that, although of the incorrect magnitude, has generically the proper shape: strongly peaked near the edge of the exposed electrode. Success in matching the body force calculations to the CFD results required the use of an arbitrary scaling factor. This approach has inadvertently led to an important insight into the plasma's interaction with the neutral atmosphere, even though it is in detail incorrect. A proper calculation would require a detailed, two-dimensional calculation of the E-field and particle densities in the discharge region.

CONCLUSIONS

Based on electrical and optical measurements of the plasma, the present invention aerodynamic plasma actuator is clearly identified as a dielectric barrier discharge device. The achieved discharge exhibits gross structure both in space and time. Since this structure clearly affects the efficiency of momentum coupling into the neutral air, bulk heating can be discounted as a mechanism for this interaction. The fact that the asymmetry in the discharge does not, however, control the direction of the momentum coupling indicates that an interaction of the plasma with the applied electric field in the discharge is responsible for the body force and subsequent momentum transfer to the neutral fluid through plasma-neutral collisions. Plasma actuation insights that come form the understanding and first-principles modeling of the dielectric barrier discharge herein are significant to the exploitation of the Actuator in technologically relevant applications that include real aircraft flight speeds, and in fact make such exploitation feasible.

While the apparatus and method herein described constitute a preferred embodiment of the invention, it is to be understood that the invention is not limited to this precise form of apparatus or method and that changes may be made therein without departing from the scope of the invention which is defined in the appended claims.

We claim:

1. Air vehicle dielectric barrier aerodynamic plasma actuator apparatus comprising the combination of:
   an aerodynamic vehicle having a vehicle airfoil component disposed in a moving air location thereof;
   a first dielectric barrier discharge electrical conductor element surrounded by an electrically insulating dielectric barrier enclosure member and disposed in a selected position on said aerodynamic vehicle component in said moving air location;
   a second dielectric barrier discharge electrical conductor element located proximate said electrically insulating dielectric barrier enclosure member and said first electrical conductor element in said selected position of said moving air location of said vehicle; and a source of dielectric barrier discharge alternating current electrical energy of kilovolt peak electrical potential connected between said first and second electrical conductor elements;

said first dielectric barrier discharge electrical conductor element, said second dielectric barrier discharge electrical conductor element and said source of dielectric barrier discharge alternating current electrical energy comprising a gaseous plasma generating dielectric barrier discharge portion of said aerodynamic vehicle airfoil;

said gaseous plasma generating dielectric barrier discharge device portion of said aerodynamic vehicle enabling one of increased thrust and diminished drag enhanced aerodynamic performance of said vehicle.

2. The air vehicle dielectric barrier aerodynamic plasma actuator apparatus of claim 1 wherein said vehicle airfoil component comprises at least one of an aircraft wing, an aircraft wing flap, an aircraft aileron, an aircraft tail surface, an aircraft engine turbine blade, an aircraft propeller, a helicopter rotor blade and a munitions device.

3. The air vehicle dielectric barrier aerodynamic plasma actuator apparatus of claim 1 wherein said second dielectric barrier discharge electrical conductor element is a bare, air exposed, conductor.

4. The air vehicle dielectric barrier aerodynamic plasma actuator apparatus of claim 3 wherein said second dielectric barrier discharge electrical conductor element has thickness and width dimensions less than a thickness dimension of said first electrical conductor element and less than a thickness dimension of said electrically insulating dielectric barrier enclosure member.

5. The air vehicle dielectric barrier aerodynamic plasma actuator apparatus of claim 1 wherein said source of dielectric barrier discharge alternating current electrical energy of kilovolt peak electrical potential includes a voltage waveform having one of a sawtooth and a triangular waveform shape.

6. The air vehicle dielectric barrier aerodynamic plasma actuator apparatus of claim 1 wherein said source of dielectric barrier discharge alternating current electrical energy of kilovolt peak electrical potential is connected with said electrodes to provide said first electrode with a negatively increasing electrical potential with respect to said second electrode over a majority of an alternating current voltage waveform cycle.

7. The air vehicle dielectric barrier aerodynamic plasma actuator apparatus of claim 1 wherein said source of dielectric barrier discharge alternating current electrical energy of kilovolt peak electrical potential is connected with said electrodes to provide said first electrode with a positively increasing electrical potential with respect to said second electrode over a majority of an alternating current voltage waveform cycle.

8. The air vehicle dielectric barrier aerodynamic plasma actuator apparatus of claim 1 wherein said apparatus is characterized by a nonlinear relationship between generated aerodynamic force and peak electrical potential of said source of dielectric barrier discharge alternating current electrical energy.

9. The air vehicle dielectric barrier aerodynamic plasma actuator apparatus of claim 1 wherein said apparatus is characterized by one of:

a $(voltage)^{7/2}$ relationship between dissipated electrical power and peak electrical potential of said source of dielectric barrier discharge alternating current electrical energy, and a $(voltage)^{7/2}$ relationship between generated plasma velocity and peak electrical potential of said source of dielectric barrier discharge alternating current electrical energy.

10. The air vehicle dielectric barrier aerodynamic plasma actuator apparatus of claim 1 wherein said aerodynamic vehicle airfoil component includes a plurality of said aerodynamic plasma actuator apparatus combinations.

11. The dielectric barrier discharge method of improving airfoil airflow characteristics of an aerodynamic vehicle component element, said method comprising the steps of:

disposing along an airfoil flow surface of said aerodynamic vehicle component element a plasma film generating electrical discharge supporting electrode array having an extended electrode dimension generally orthogonal of airflow across said airfoil airflow surface;

providing in said electrical discharge supporting electrode array a first dielectric barrier enclosure-surrounded electrode conductor and an overlying, adjacent, laterally displaced, second airflow exposed electrode conductor;

growing a filamented, light-emitting, time dependent dielectric barrier discharge plasma film over a first electrode conductor-adjacent surface of said dielectric barrier enclosure;

said time dependent growing plasma film extending in a direction determined by relative positioning of said first electrode conductor and said second electrode conductor on said airfoil-airflow surface and extending over a time dependent distance of said dielectric barrier enclosure;

said growing step including energizing said second airflow exposed electrode conductor with a source of alternating current electrical energy of kilovolt peak electrical potential with respect to said first dielectric barrier-surrounded electrode conductor; and selecting a dielectric barrier plasma film enhancing alternating current electrical energy voltage waveform of relatively slow voltage change in one polarity direction and relatively fast voltage change in opposed polarity direction for said source of alternating current electrical energy of kilovolt peak electrical potential;

said energized electrical discharge supporting array generating a plasma directed momentum influenced improved pattern of air flow across said aerodynamic vehicle component element airfoil airflow surface.

12. The dielectric barrier discharge method of improving airfoil airflow characteristics of an aerodynamic vehicle component element of claim 11 wherein said time dependent plasma film extends in a direction parallel with said airflow across said airfoil airflow surface;

said time dependent growing plasma film extending in a direction determined by relative positioning of said first electrode conductor and said second electrode conductor on said airfoil airflow surface and extending over a time dependent distance of said dielectric barrier enclosure.

13. The dielectric barrier discharge method of improving airfoil airflow characteristics of an aerodynamic vehicle component element of claim 11 wherein said step of energizing said second airflow exposed electrode conductor with a source of alternating current electrical energy of kilovolt peak electrical potential with respect to said first dielectric barrier-surrounded electrode conductor and said waveform of relatively slow voltage change in one polarity direction and relatively fast voltage change in opposed polarity direction comprise energizing said conductors with alternating current energy of sawtooth voltage waveform.

14. The dielectric barrier discharge method of improving airfoil airflow characteristics of an aerodynamic vehicle component element of claim 11 wherein said filamented-light-emitting, time dependent dielectric barrier discharge plasma film includes an irregular and growing film boundary opposite a linear initial starting location proximate one of said electrodes.

15. The dielectric barrier discharge method of improving airfoil airflow characteristics of an aerodynamic vehicle component element of claim 11 wherein said dielectric barrier plasma film enhancing alternating current electrical energy voltage waveform comprises one of a sawtooth and a triangular voltage waveform.

16. Aircraft airfoil directed momentum single dielectric barrier aerodynamic plasma actuator apparatus comprising the combination of:
an exposed dielectric barrier discharge first electrode member located in a first location of an airflow stream across an aerodynamic airfoil element of said aircraft;
a dielectric barrier-surrounded and enclosed second electrode member located in an adjacent but displaced second downstream location of said aircraft aerodynamic airfoil element with respect to said first electrode member; and
a source of plasma generation-efficient waveform alternating current electrical energy of kilovolt peak electrical potential connected between said first and second airfoil electrode members;
said dielectric barrier discharge first electrode member and said dielectric barrier surrounded second electrode member being disposed adjacent a point of airflow separation of said airfoil.

17. The aircraft airfoil dielectric barrier aerodynamic plasma actuator apparatus of claim 16 wherein said airfoil comprises one of a wing, a tail and a force generating element of said aircraft.

18. The aircraft airfoil dielectric barrier aerodynamic plasma actuator apparatus of claim 16 wherein said directed momentum dielectric barrier discharge aerodynamic plasma actuator apparatus is disposed adjacent one of a leading edge and a trailing edge of said airfoil.

19. The method of generating airfoil aerodynamic performance enhancing time segregated bursts of filamentary single dielectric barrier discharge ionized gas plasma adjacent an airfoil airflow surface of an airborne vehicle component, said method comprising the steps of:
energizing a pair of airborne vehicle airfoil airflow surface mounted electrodes with alternating current electrical energy of kilovolt electrical potential and selected voltage waveform;
said pair of airborne vehicle airfoil airflow surface mounted electrodes including a first dielectric barrier-surrounded and enclosed electrode and an adjacent second, airfoil airflow exposed bare conductor, electrode displaced upstream along said airfoil airflow from said first electrode;
said selected voltage waveform including first and second portions of selected electrode polarity, frequency and waveform rate of voltage change; and
selecting separation dimension, airfoil airflow surface position, shape and cross sectional physical attributes of said first and second electrodes and said dielectric barrier and magnitude of said kilovolt electrical potential in response to desired dielectric barrier discharge characteristics of said generated ionized gas plasma adjacent said airfoil airflow surface.

20. The method of generating airfoil aerodynamic performance enhancing time segregated bursts of filamentary dielectric barrier discharge ionized gas plasma of claim 19 wherein said selecting step includes disposing said pair of airborne vehicle flow surface electrodes adjacent a point of airflow separation on said airfoil airflow surface.

21. The method of generating airfoil aerodynamic performance enhancing time segregated bursts of filamentary dielectric barrier discharge ionized gas plasma of claim 19 wherein said selecting step includes disposing said pair of electrodes adjacent one of a leading edge and a trailing edge of an airflow surface of said airfoil.

22. The method of generating airfoil aerodynamic performance enhancing time segregated bursts of filamentary dielectric barrier discharge ionized gas plasma of claim 19 wherein said step of selecting includes enhancing performance of said airborne vehicle airflow surface mounted electrodes by minimizing a thickness dimension of said airfoil airflow exposed bare conductor electrode.

23. The method of generating airfoil aerodynamic performance enhancing time segregated bursts of filamentary dielectric barrier discharge ionized gas plasma of claim 19 wherein said selecting step includes choosing an electrical breakdown immune thickness dimension of said dielectric barrier in response to an elected magnitude of said kilovolt electrical potential.

24. The method of generating airfoil aerodynamic performance enhancing time segregated bursts of filamentary dielectric barrier discharge ionized gas plasma of claim 19 wherein said selecting step includes choosing an optimum length dimension for said dielectric barrier surrounded electrode in response to a selected magnitude of said kilovolt electrical potential.

* * * * *